(12) United States Patent (10) Patent No.: US 12,086,766 B2
Gandhi et al. (45) Date of Patent: Sep. 10, 2024

(54) DOMAIN-BASED VISUALIZATIONS OF MESSAGING CONTENT

(71) Applicant: YAHOO ASSETS LLC, Dulles, VA (US)

(72) Inventors: Kaivalya Niranjan Gandhi, San Francisco, CA (US); Melissa Bica, Boulder, CO (US); So Young Han, Sunnyvale, CA (US); Wei Jia Tan, Santa Clara, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/056,398

(22) Filed: Nov. 17, 2022

(65) Prior Publication Data

US 2023/0153761 A1 May 18, 2023

Related U.S. Application Data

(60) Provisional application No. 63/280,387, filed on Nov. 17, 2021.

(51) Int. Cl.
*G06Q 10/107* (2023.01)
*G06F 3/04817* (2022.01)
*G06F 3/0482* (2013.01)
*G06F 3/0485* (2022.01)

(52) U.S. Cl.
CPC ....... *G06Q 10/107* (2013.01); *G06F 3/04817* (2013.01); *G06F 3/0482* (2013.01); *G06F 3/0485* (2013.01)

(58) Field of Classification Search
None
See application file for complete search history.

(56) References Cited

U.S. PATENT DOCUMENTS

| 2015/0186517 A1* | 7/2015 | Gilad | G06F 16/338 707/722 |
| 2016/0219004 A1* | 7/2016 | Erez | H04L 51/08 |
| 2019/0220541 A1* | 7/2019 | Meling | H04L 51/04 |

\* cited by examiner

*Primary Examiner* — Anh Nguyen
(74) *Attorney, Agent, or Firm* — James J. DeCarlo; Greenberg Traurig

(57) ABSTRACT

Disclosed are embodiments for providing a domain-specific visualization of message content. Unclassified messages are received for a sender and a real-time classifier is used to assign categories to the messages. User interactions with email can then be used to generate a ranked list of domain-specific senders. This ranked list of senders and classified emails can then be used to provide a domain-specific view to a user. Further features (e.g., aggregated content pages by sender, dynamic call-to-action buttons, message previews etc.) can then be built on top of the ranked senders and messages.

20 Claims, 21 Drawing Sheets

DOMAIN-BASED VISUALIZATIONS OF MESSAGING CONTENT

CROSS-REFERENCE TO RELATED APPLICATIONS

This application claims the benefit of U.S. Provisional Patent Application No. 63/280,387, filed Nov. 17, 2021, which is incorporated by reference herein in its entirety.

BACKGROUND

The example embodiments are directed toward electronic messaging and, in particular, to improved visualizations of electronic messages based on a domain of the electronic messages.

Currently, electronic messaging tools (e.g., electronic mail) are heavily used for a variety of activities. Such activities generally extend beyond the original intent of the electronic messaging tools. For example, many electronic mail users use inboxes to store e-commerce data (e.g., receipts, deals, promotions, etc.), personal notes (e.g., mail self-directed to the user), health care data (e.g., medical records), and other classifications or domains of data.

Many electronic messaging applications make no distinction among domains of messages. Instead, such electronic messaging applications simply display a chronological listing of messages as they are received. Such electronic messaging applications often rely on search or other filtering techniques to enable users to identify desired content. However, such techniques necessarily do not result in a complete identification of desired content. Further, such techniques cannot themselves surface content that the user is not already aware of. As such, many important or otherwise desired domain-specific content can be missed in the large volume of messages the everyday user receives. Thus, there is currently a technical need in the state of the art for a system that automatically processes and classifies message content and provides a client-side application for visualizing all content from a domain.

BRIEF SUMMARY

The example embodiments describe a domain-based visualization within a messaging application. Such a visualization can aid an end user to execute any task that involves email information. In the examples, the domain referenced is shopping (e-commerce or in-store activities). As part of the visualization, a way of automatically identifying and highlighting the brands a user tends to interact with gives the user the ability to easily access aggregated email content grouped by brand. Furthermore, the visualization outlines a way to only show emails from a subset of identified brands by giving the user the ability to indicate a preference for certain brands. As part of the visualization, a way of identifying and highlighting the sub-categories within a domain that a user has an interest in gives the user the ability to only show emails from those categories or sub-categories. In some embodiments, the visualization can also include message previews with dynamic call-to-actions surfaced alongside the corresponding message preview.

The example embodiments provide novel functionality and user experience paradigms for consuming messages from topically organized content. For example, users can automatically view content (e.g., extracted deals that can optionally be saved, messages, extracted receipts, affiliate products) grouped by eligible senders and prioritize which senders they will see updates from first by favoriting them. Further outlined is the real-time filtering of recent messages from favorited shopping senders or an eligible topic (as classified by messaging systems) and being able to triage (e.g., mark as read, archive, delete) the specific corresponding list. In some embodiments, the example embodiments can provide previews of messages in a finite feed and can enable directly navigating to the sender's website from the feed through a dynamic call-to-action based on the messages topic.

The example embodiments leverage the fact that email messaging today is primarily a business-to-consumer platform rather than a person-to-person communication platform. For the vast majority of everyday users, receiving deals, coupons, or marketing material is the most common use case for their email. However, despite the prevalence of commercial messaging in people's inboxes, it is rife with problems in the context of everyday email use. Consumers frequently complain about getting too many emails and being unable to find or identify emails that are important. The example embodiments address some of the major pain points users face with their commercial messaging and create an experience within a messaging application which users would find valuable for shopping use cases, while additionally increasing inbox monetization opportunities for service providers and brands who invest millions to billions annually to reach their consumers.

This user experience addresses a pain point that many users expressed with their messaging applications: the fear of missing out on desirable deals in their inbox in the sea of messages received daily. Creating a domain-specific visualization in the messaging application using the example embodiments addresses this fear of missing out on deal messages as it enables users to find all their deal messages are organized in one dedicated place, rather than sifting through many other types of messages to discover a great deal.

The domain-specific visualization also supports the most common way that people find message deals that they end up using, which is by chance rather than by intentional searching. One such feature that supports such serendipitous deal discovery is the visual message previews, which give a glimpse of each message from the message list before opening any particular one. These visual previews provide even more attention-grabbing context of the message content—such as what items are on sale or what percentage a purchase can be discounted—beyond just the subject line and message snippet and can help inspire purchases.

The organization of messages by brand within the dedicated view also addresses the problem of not being able to find a particular message containing valuable content such as a purchase receipt or personalized offer from a brand or store. This is often encountered in time-sensitive situations such as waiting in a store's checkout line. This feature enables users to quickly navigate to all their messages received from a particular brand or store to find a desired message more easily. Additional at this point include deals and receipts to further narrow down content of interest.

The organization of messages by categories within a domain addresses the use case of wanting to buy something in a particular category, but with no product or store in mind. For instance, people often turn to their messages to find what restaurants are offering deals they could use to order dinner. With filters for common categories such as Dining, Clothing, and Home, users can easily browse all the deals and promotions they have in their inbox just for that category.

DETAILED DESCRIPTION

Figure 1:
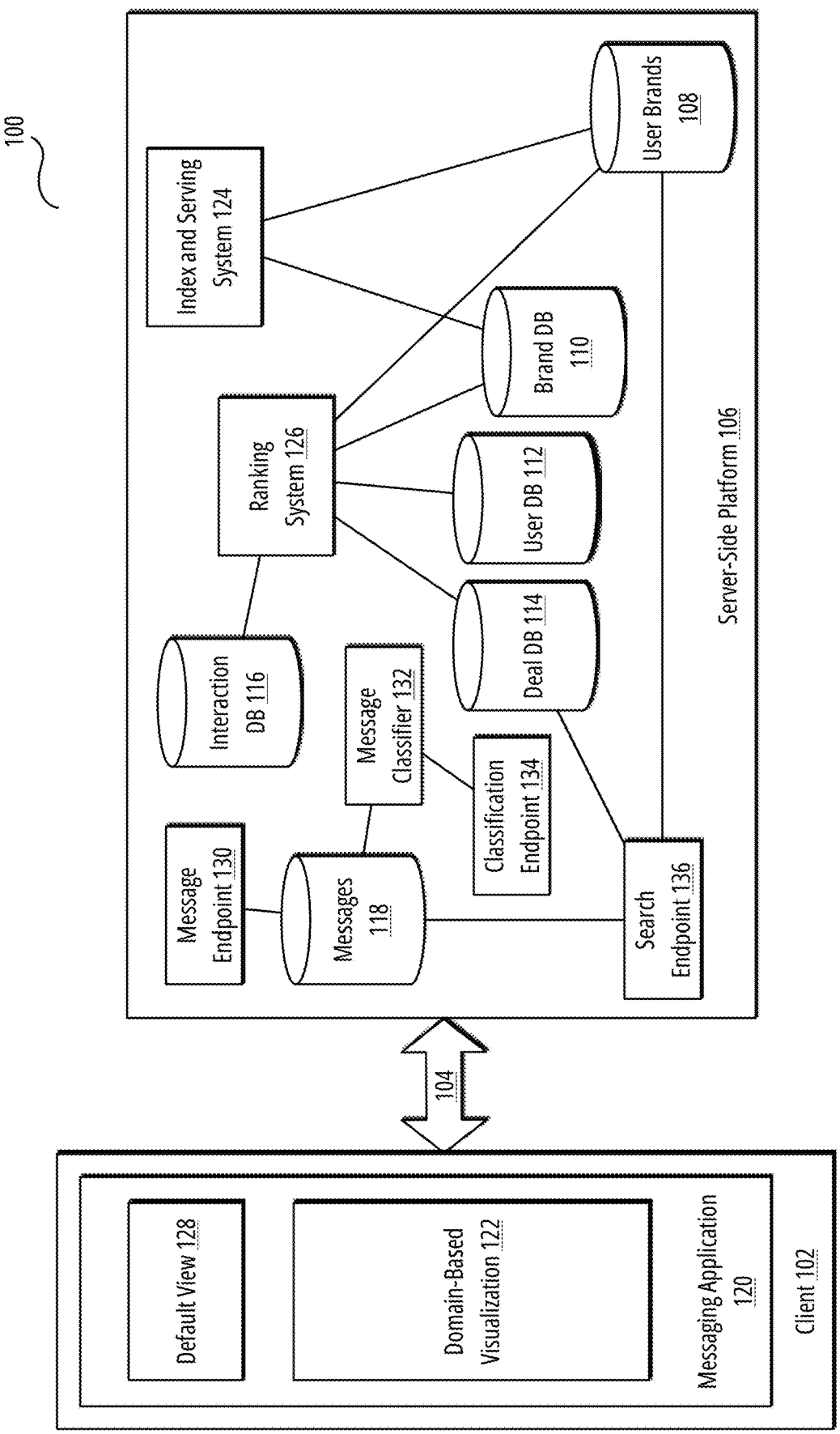
FIG. 1 is a block diagram illustrating a system 100 for providing domain-based visualizations of messaging content according to some of the example embodiments.

In the example embodiments, a list of entities or senders (e.g., brands) are automatically organized in a horizontal scrollable carousel (tapping into existing user mental models around familiarity with the "stories" content format in social media applications). These entities are inherently relevant to the user, by virtue of meeting an engagement criterion (e.g., the user must have interacted with the brand by, for example, opening a message, by clicking on a link within the message and numerous other such interaction signals) or the brand must have interacted with the user (for example, by sending a message), once in a previous time period (e.g., the last thirty-five) days. These interaction signals influence the ordering of the entities, fulfilling an algorithmic feedback loop that periodically updates the ordering based on a user's engagement and interaction patterns.

The described carousel design optimizes for information density (relative to how much of the screen the user interface takes up), click throughs (i.e., how many steps does a user need to take to see value) and interaction familiarity. The example embodiments also leverage the ease of use of a list (which has lesser information density), and thus incorporate a list-view (e.g., message list) that is accessible at two levels: before clicking a shortcut in the three-dot menu of the carousel and on a sender's storefront itself after the corresponding shortcut is clicked through the "All" button. This page contains a list of all eligible entities based on content extracted from a user's inbox. It can be organized alphabetically, and the user has the ability to indicate specific entities as favorites through a user interface (UI) element (star, in this example). In this instantiation, the entities represented are brands.

The badge can include the count of deals extracted for the particular brand since the last time a user has visited the brand's storefront by clicking on the shortcut or manually performing the "Clear updates" action from the three-dot menu of the carousel.

The three-dot menu provides additional related functionality to the novel components of the user interface. With shortcuts in the domain-specific view, message application users are able to see new deals since their last visit to the view. The badge counts shown to users in the carousel displays the count of new deals for each brand since the users' last visit or app refresh. Mail systems can process and expose up to 18,000 new deals per minute from all supported brands for all users. Users have the ability to "clear" these updates which resets the counts. They can also manage their favorites and share feedback.

Relevant available content from an entity is automatically organized into a dynamic page, whose sections adapt based on the data. In the example embodiments, the content supported for brand entities is translated into the following sections and referenced as a unified group with the moniker of "Storefronts": deals, emails, receipts, products. For entities of a different type (e.g., newsletters) the sections would vary (for example: public, member-previews, member-only, monthly digests etc.). This interface also provides the ability to switch between pages from the top of the page, by accessing the ranked carousel of entities that is available in shortcuts. The current entity page can be anchored to the top-left, allowing a user to continue their consumption and switch between entity pages relevant to them. There is an indication of which entity page has new content, as signified by the purple dot, which abstracts the badge count that is shown in shortcuts. The entity page also provides a navigational affordance to view a list of all of the user's eligible entities, based on content extracted from their inbox.

Filters can provide a novel way to parse messages and reduce overwhelm from the high volume of messages received from senders in a user's inbox. Filtering by favorited brands provides the ability to narrow down recent messages (e.g., from the past six days) while filtering by a finite list of topical categories (as classified by a mail system) that are aligned with a broader intent (in this case, shopping)—the set of topical categories that would be relevant for a given intent would differ.

A message feed can support two user consumption modes: list mode and preview mode. Both modes show a series of messages, e.g., ranked in reverse chronological order of message delivery. The feed can be finite, and thus can contain messages received in the past six days. In the future, alternative ranking methodologies could be applied, such as using a relevancy score instead of sorting by timestamps. The feed also contains a dynamic call-to-action button applied for each feed item (e.g., email). This call-to-action would lead the user to the corresponding message sender's website, if the link embedded inside the corresponding message is unable to be detected successfully. This call-to-action is also wrapped in an affiliate provider's link before navigating to the final destination, to achieve attribution for sending users with a purchasing intent. The preview is intended to show the relevant snapshot of a message that would entice the user to click on the call-to-action button without opening the message itself. As such, future enhancements to the technical implementation would experiment with showing the preview at different offsets of the message content, and need not be restricted to just the start of the message.

A server-side framework includes offline pipelines for training, evaluation and application of a machine learned-model for personalized brand icon ordering. In an embodiment, the process includes the following steps.

First, the framework can compute user and brand features (signals) for all users by mining user logged-in attributes (age, gender, location, etc.), past message interactions, as well as extracted mail data such as orders and deals. The framework can associate each message and its related interactions to a specific brand or store (Walmart, Nike, etc.). For example, the resulting set of features the framework can use comprises signals that relate to interactions between the user and the brand, and also include some border attributes pertaining to the brand or the user alone. The first set includes prominent signals such as the volume of messages the user received from the brand, the engagement rate, the order frequency and so on. The brand features include global metrics pertaining to the brand popularity, average user engagement, and its click rate as a store shortcut. Finally, the framework can also keep some broader attributes associated with the user, describing his/her level of engagement with email and shopping in general. The model can later use these attributes to divide the users into segments and tune a slightly different experience for each. All volume and rate features are computed over multiple periods, such as the past month, week, or day, to allow the model to differentiate between recent and past activity. The foregoing features are examples and not limiting.

Next, the system can train a machine-learned model to capture the affinity between each user and each brand. To this end, the system can define positive and negative labels based on prominent user interactions with brands, such as placing an order or clicking on message links. The system can also use click signals associated with the new feature to further tune our ranking mechanism. The system can employ any prediction model that is suitable for ranking tasks, either based on support vector machine (SVM) models, Neural Networks or Decision Trees. For example, in one embodiment, the system can use a model based on Gradient Boosted Decision Trees, or simply GBDT, for short, which is an iterative method for producing ensembles of weak, non-linear prediction models that are in this case decision trees. This model is highly effective in handling ranking tasks.

Finally, the system can apply the model and predict which brands each user is most likely to interact with. In some embodiments, this can be done on a daily basis. The top results are then stored in a database, and served by various online clients given the user identity.

A classification system (CAAS) is also included which is a real time classification system for messages, which classifies messages pre-delivery in multiple ways using multiple approaches. One such classification is to classify emails with Spice Tags (Type, Topic and Objective). This involves two stage classification. In the online stage we use a TF model (which requires email metadata such as Subject, Sender Name and Sender Address) to infer Spice tags. If unsuccessful we then look for the sender-based aggregation data (generated offline) to predict the tags. The sender-based aggregation data is generated in a grid pipeline. By taking the inference of a TF model which requires mail metadata and some part of content and grouping the senders based on tags inferred. The inferred Spice Tags are stored (during mail delivery) in the email metadata in the form of JSON schema. This JSON schema is indexed by "Force" (metadata store) thus making the emails searchable by Spice tags.

In some embodiments, system can further include a sender aggregation system (which aggregates emails by sender domains), an entity ranking system (which ranks the aggregated entities based on user interactions and preferences), an entity rendering system (to display the relevant entities), a message classification system (which classifies the topic, intent, type etc. of emails), a content extraction system (which extracts deals and receipts from emails), a feed rendering system (to display the relevant emails in the list as list items or preview items, applying a category if the user chooses to do so, along with a dynamic contextual call-to-action which links to the sender's website), and/or a feed manipulation system (to apply feed actions such as marking all emails in the list as read, deleting all emails in the list etc. if a user chooses to do so). In an embodiment, the content extraction system processes the emails already delivered to a user's inbox to detect deals and receipts. The sender aggregation system would first analyze all the emails from a user's inbox to output the distinct entities detected from the data. These distinct entities would have metadata associated with them, leveraging the outputs from the content extraction system. The entity ranking system would then rank these entities using user preferences (whether an entity was marked as a favorite) and interaction signals (such as opening emails, clicking on links from that sender, receiving receipts etc.) which would be leveraged by the entity rendering system. The email classification system processes the emails incoming to a user's inbox in real-time, before they are delivered to a user. This output is used by the feed rendering system. The output of the feed rendering system is then available to the feed manipulation system. Some of these components are illustrated in the following FIG. 1 but the disclosure is not limited to only those components discussed in FIG. 1

FIG. 1 is a block diagram illustrating a system 100 for providing domain-based visualizations of messaging content according to some of the example embodiments.

Figure 6:
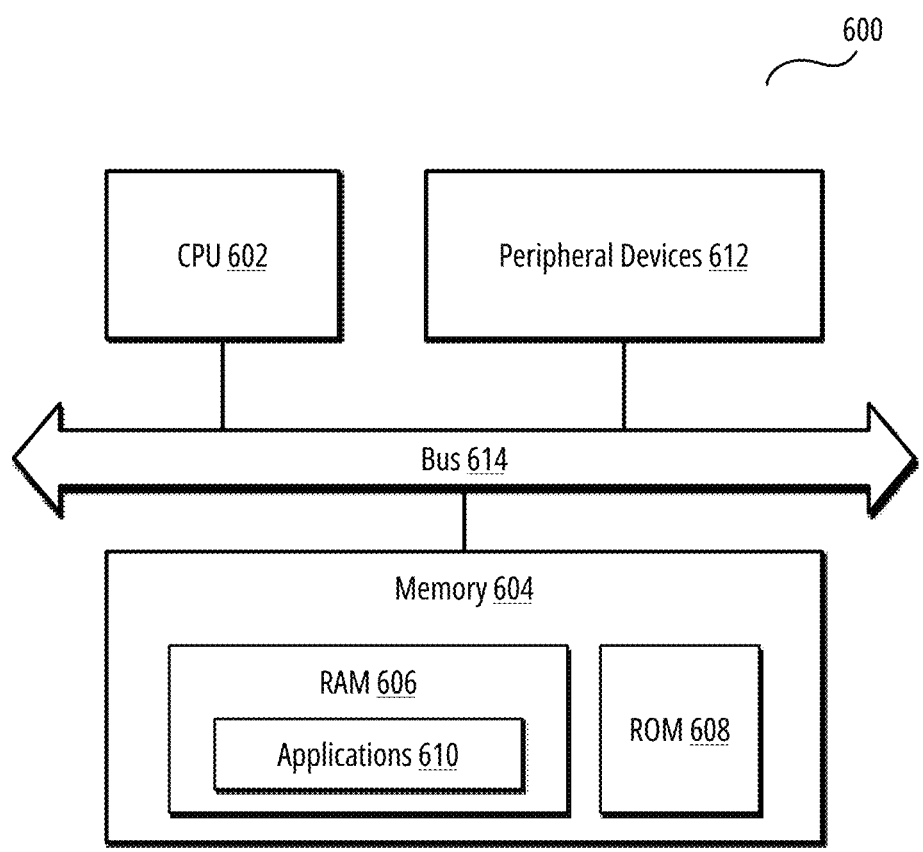
FIG. 6 is a block diagram of a computing device 800 according to some embodiments of the disclosure.

The system 100 includes a client device 102 and server-side platform 106 connected via a network 104. In an embodiment, client device 102 can comprise a mobile device (e.g., mobile phone, tablet, etc.), desktop or laptop computing device, or any similar device. One example of such a device is depicted in FIG. 6. Although only a single client device is illustrated, the disclosure is not limited as such; and multiple client devices may communicate over network 104 with server-side platform 106.

The server-side platform 106 can comprise one or more computing devices designed and implemented to provide network-based services to client device 102. For example, server-side platform 106 can comprise a cloud platform for providing web-based or otherwise network-based services via, for example, application programming interface (API) calls. The various sub-components of server-side platform 106 can be implemented using general-purpose computing devices (illustrated in FIG. 6). In an embodiment, some or all of the various sub-components can be implemented using special-purpose computing devices (e.g., database servers, etc.).

In an embodiment, network 104 can comprise one or more networks for allowing communications between client device 102 and server-side platform 106. For example, network 104 can comprise a public internet as well as a mobile network (e.g., radio access network and core network) or wireless local area network (WLAN). No limit is placed on the type and number of networks making up network 104 so long as they provide a communications channel between client device 102 and server-side platform 106.

The server-side platform 106 includes a plurality of databases storing data for providing domain-based visualizations including user brands database 108, brand database 110, user database 112, deal database 114, interaction database 116, and message database 118. In an embodiment, user brands database 108 stores data relating to a user's favorite brands. For example, user brands database 108 can store a mapping of users (stored in 112) to brands that are favorited or otherwise saved by the user. In an embodiment, brand database 110 can store canonical data regarding brands such as names, websites, locations, etc. In an embodiment, user database 112 can store data regarding users such as a unique identifier, username, etc. In an embodiment, deal database 114 can store data regarding promotional offers, sales, or other data associated with brands stored in brand database 110. In an embodiment, interaction database 116 can store data regarding user interactions with brands via interactions with messages stored in message database 118. In an embodiment, message database 118 can store message data associated with users stored in user database 112 such as email messages, instant message data, etc.

During operation, a messaging application 120 running on client device 102 can authenticate to server-side platform 106 and retrieve a set of messages stored in message database 118 by calling a message endpoint 130. In some embodiments, messaging application 120 can display these messages in chronological order in a default view 128. In some embodiments, the returned messages can be augmented with brand and deal data stored in brand database 110 and user database 112, respectively. However, in some embodiments, a "default" view may not use brand/deal data and may simply display a chronological list of messages.

In some embodiments, a domain-based visualization component 122 can also issue a query to server-side platform 106 to obtain a list of a user's favorite brands. For example, the domain-based visualization component 122 can query an index and serving system 124 to request a list of ranked brands. In some embodiments, a ranking system 126 can be configured to predict a ranking for each of a user's favorite brands. In some embodiments, the ranking system 126 can comprise one or more predictive models that reads data from brand database 110, user database 112, deal database 114, and interaction database 116 and generates a predicted ranking for a given brand. In an embodiment, the predictive model can comprise a decision tree. In an embodiment, the predictive model can comprise a gradient-boosted decision tree such as XGBoost. The predictive model can use or generate a plurality of features for both training and prediction. These features are generated based on the data stored in brand database 110, user database 112, deal database 114, and interaction database 116. Examples of user-centric features include a user's number of brands (brands found in messages), a number of active brands (brands a user interacts with), a volume of messages received, a volume of messages opened, a volume of messages mail clicked on, and a number of orders extracted from messages. Further examples of brand-centric features include the message open rate of a given brand, the message click rate of a given brand, an ordering rate of a given brand, a number of users receiving messages from a given brand. Further examples of user-brand features (brand or user-level features limited to a corresponding user or brand, respectively) include a volume of messages received, a volume (or rate) of orders in messages, a promotional message volume, a recommended deals volume, a message opened volume (or rate), a message click volume (or rate). Further examples can include user interaction volumes or rates with shortcuts such as brand icons or other user interface elements. The foregoing features can be computed over a fixed time threshold (e.g., the last month, week, day, etc.). In an embodiment, the predictive model can use multiple labels for prediction. These labels can include, for example, a number of message interactions (e.g., clicks), a number of shortcut (e.g., brand icon) clicks, a number of orders placed, etc.

During training, a set of users can be loaded, and the following features and labels created for each user-brand pair (features and labels are referred to as labeled examples). The labeled examples can then be used to train the predictive model (with appropriate weighting and hyperparameters tuning to meet an accuracy threshold). Then, during prediction, the serving system 124 can load all of the user's favorited brands (from user brands database 108) and generate user-brand pairs. These user-brand pairs can then be used to generate the same features calculated based on the most recent data in the various databases. Finally, serving system 124 can input these features into the predictive model and receive a predicted ranking for each brand associated with a user. The ranked list can then be provided to the client device 102 in response to a request. The client device 102 can then use the ranked list to display a set of shortcuts or brand icons used for interacting with domain-based visualization component 122. Further detail on classification is provided in Appendix B and that detail is not repeated herein in detail in its entirety.

In the illustrated embodiment, the server-side platform 106 can further include a real-time message classifier 132. In some embodiments, the real-time message classifier 132 classifies messages before they are delivered to end-users in multiple ways using multiple approaches. One such classification is to classify emails with "Spice Tags" (Type, Topic and Objective). This involves two stage classification. In the online stage, the real-time message classifier 132 can use a predictive model which can use email metadata such as Subject, Sender Name and Sender Address to infer Spice tags. If unsuccessful, the real-time message classifier 132 can then look for the sender-based aggregation data (generated offline) to predict the tags. The sender-based aggregation data is generated in a grid pipeline. By taking the inference of a predictive model which requires mail metadata and some part of content and grouping the senders based on tags inferred. The inferred Spice Tags are stored (during mail delivery) in the email metadata in the form of JSON schema. This JSON schema is indexed by "Force" (metadata store) thus making the emails searchable by Spice tags.

The server-side platform 106 can further include a search endpoint 136 that can receive queries from client device 102 and return search results in the form of messages, brands, deals, etc. The server-side platform 106 can further include a classification endpoint 134 that can receive requests for a taxonomy and return a list of known categories (either globally or for a specific user). The server-side platform 106 can support additional APIs to provided data to client device 102. Details of some of these APIs are provided in Appendix C and incorporated herein by reference in their entirety.

FIGS. 2A through 2F illustrate user interface states of an onboarding procedure according to some of the example embodiments.

In a first screen 200A, a user is presented with a domain-specific view of a messaging application. In the illustrated embodiment, the domain comprises a shopping or e-commerce domain, although the example embodiments are not limited as such. Further, the messaging application comprises an electronic mail application, although the example embodiments are not limited as such. In some embodiments, first screen 200A can be triggered by selecting an icon in the tab bar 208. For example, when the "Inbox" tab of tab bar 208 is selected, a standard domain-agnostic view of messages can be displayed (e.g., a chronological listing of email messages). However, when the "Shopping" tab of tab bar 208 is selected, the application displays a custom domain-specific view, as illustrated in first screen 200A.

In some embodiments, when a user selects the designated tab ("Shopping") in tab bar 208 for the first time, an onboarding procedure can be initiated. The onboarding procedure can be used to initialize a set of designated senders. In some embodiments, the types of senders vary depending on the domain. As illustrated, in a shopping domain the senders can be brands or stores. In some embodiments, a server-side process can pre-identify designated senders by bulk analyzing messages associated with a user. In panel 202, the first screen 200A displays a call to action which presents a button ("Select your Favorite Brands") that allows a user to browse the pre-identified designated senders and select none, some, or all of the pre-identified senders as favorite senders.

Figure 2A:
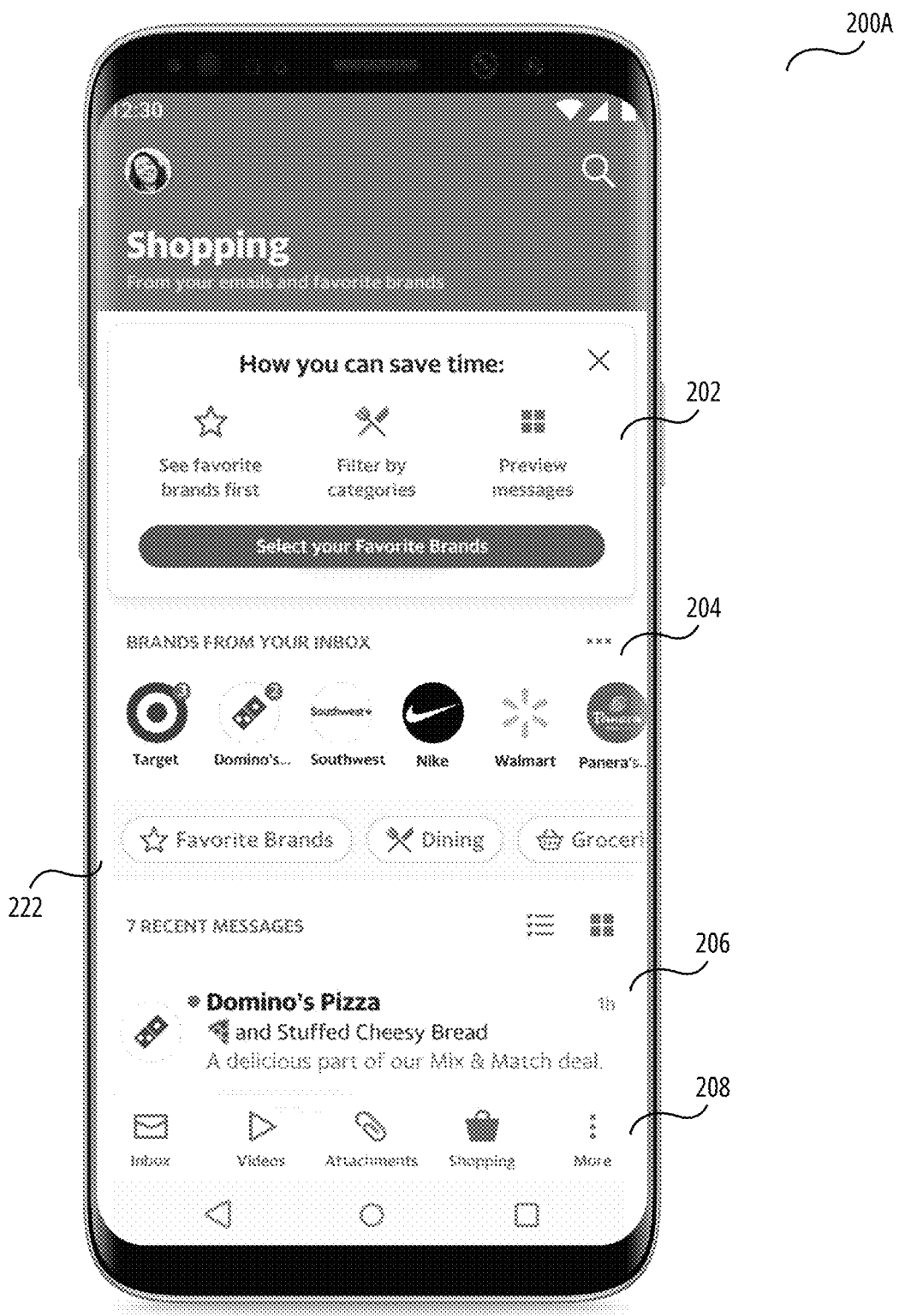
FIGS. 2A through 2F illustrate user interface states of an onboarding procedure according to some of the example embodiments.
Figure 2B:
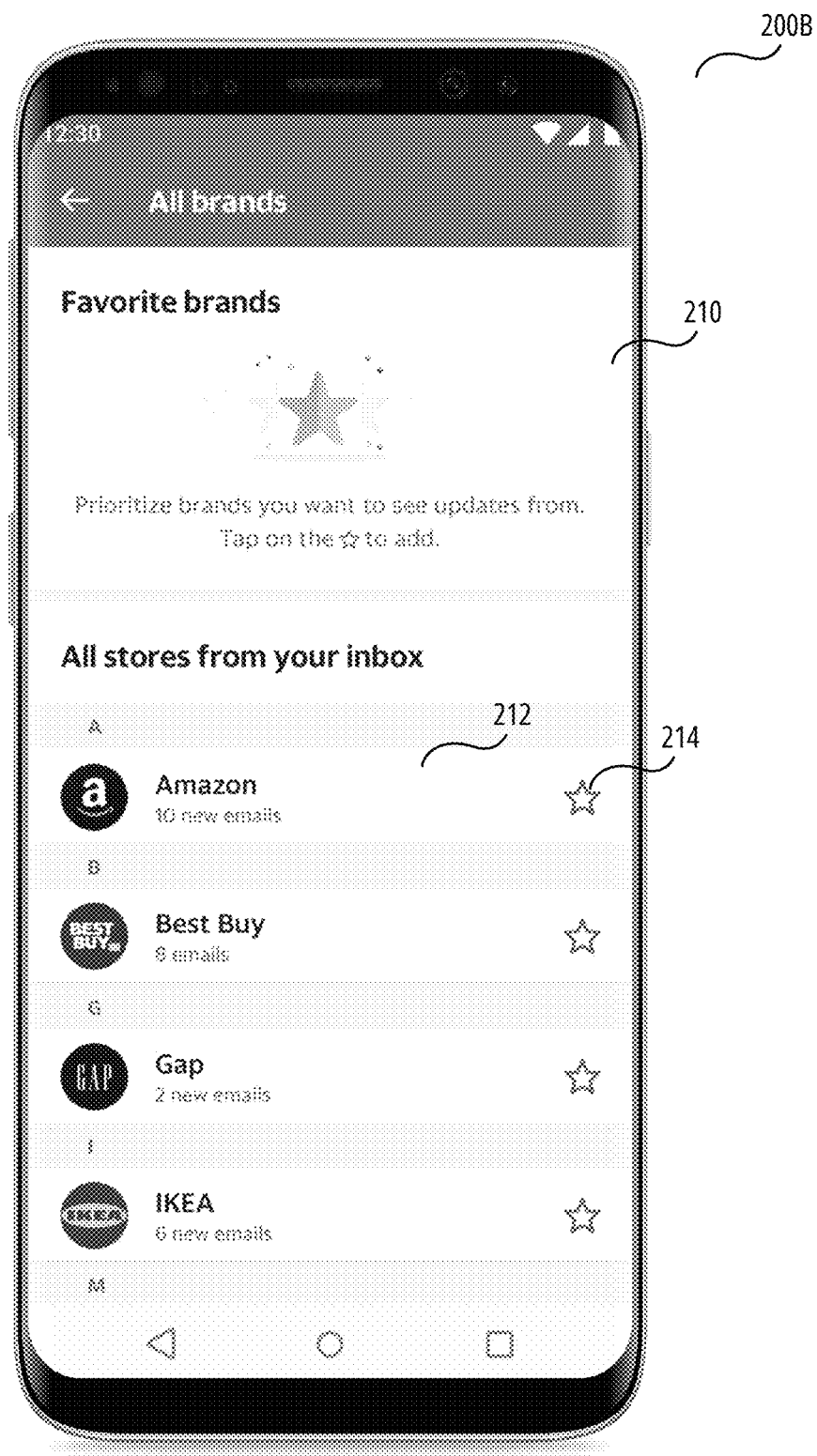
Figure 2C:
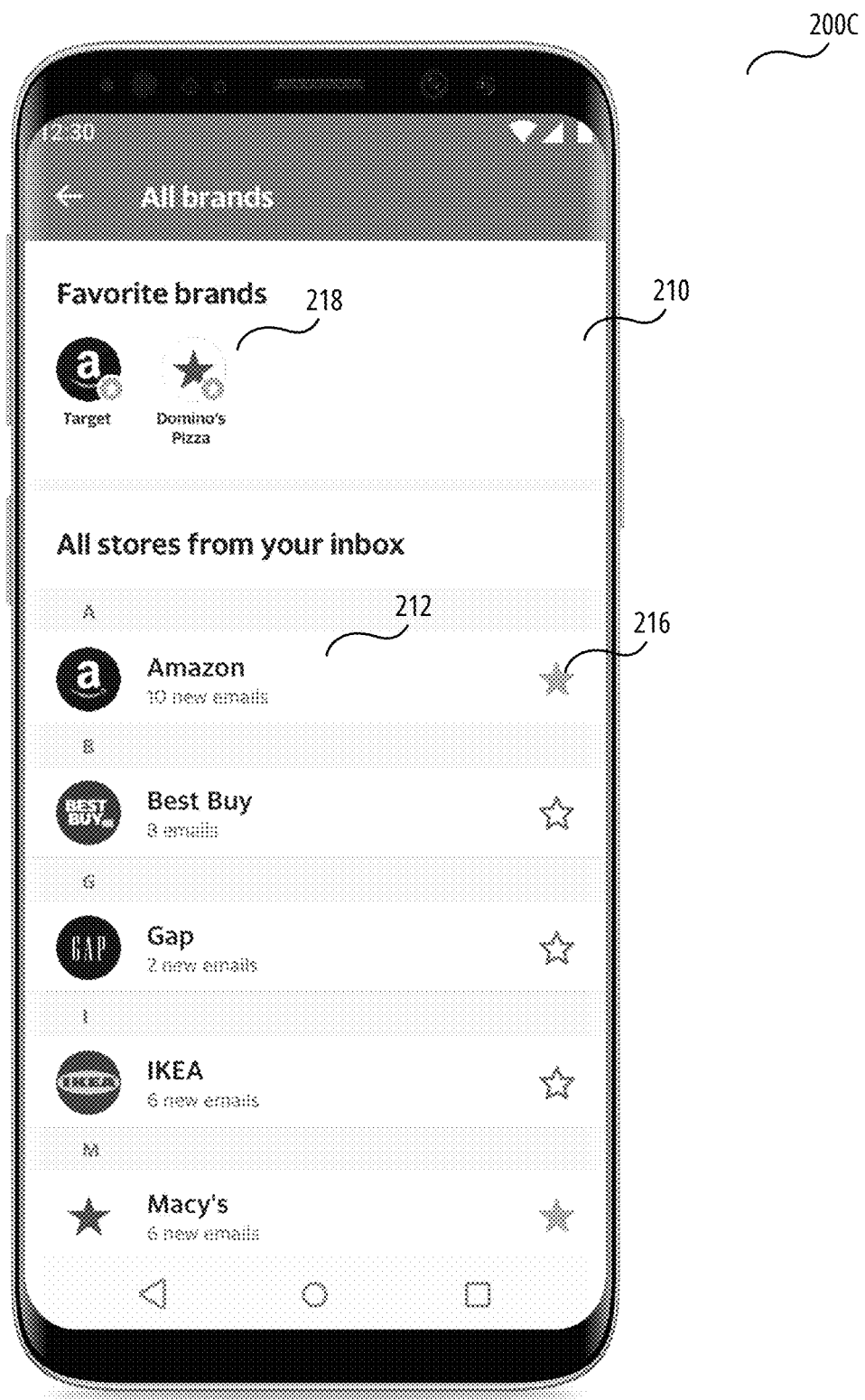

As illustrated in second screen 200B of FIG. 2B, the designated senders identified for a user can be transmitted from the server to the application and displayed in a list view. For example, the list view of second screen 200B includes a plurality of pre-identified designated senders including designated sender 212. As illustrated, the list view can be sorted and a count of messages can be provided. Other metrics can be displayed along with, or in lieu of, a message count. The designated sender 212 can also be associated with a control 214 that enables adding the sender to a list of favorites. In some embodiments, in response to selecting the control 214, the application can locally add the designated sender to a list of favorites as displayed in favorite region 210. Alternatively, or in conjunction with the foregoing, the application can transmit the identify of the selected sender to a server for cross-device persistence.

As illustrated in third screen 200C, as a user selects designated senders (via control 214), the control can change to indicate the selection as shown via control 216. Further, a favorites panel 218 can be updated to include all selected senders. In some embodiments, the favorites panel is scrollable in the horizontal and/or vertical directions.

Returning to FIG. 2A, the first screen 200A can also include a carousel 204 that includes some or all of the pre-identified designated senders. As illustrated in FIG. 2A, the carousel 204 can include icons or avatars representing the senders as well as other types of badges such as a message count (illustrated in FIG. 2A). In some implementations, the carousel 204 can prioritize favorited senders (e.g., including them first in the list of icons or avatars). As illustrated in fourth screen 200D of FIG. 2D, once a user has selected favorite designate senders, these icons or avatars can further be adorned with badges indicating inclusion in a favorites list (such as icon 220).

The first screen 200A and fourth screen 200D further illustrate a filter bar 222. In the illustrated embodiments, the filter bar 222 operates to reduce the number of message items in message list 206. In some embodiments, message list 206 can by default show all domain-specific messages. That is, in the illustrated embodiments, message list 206 can show all shopping-related messages while not showing other messages (e.g., personal messages, newsletters, etc.). The filter bar 222 operates to further refine the listing in response to user selection. As illustrated, the filter bar 222 can include a plurality of buttons that corresponded to preset quick filters. For example, a "Favorite Brands" button causes message list 206 to only display messages received from designated senders included in a list of favorites. In some implementations, the filter bar 222 may include a "categories" button. When selected, the categories button can display a list of categories associated with messages (e.g., "Food," "Clothing," "Home," "Electronics," "Travel," "Beauty," "Health," "Sports," "Crafts," "Entertainment," etc.). In some implementations, the categories button can be in addition to the individual category buttons (e.g., "Dining" as illustrated), while in other implementations, the categories button may be displayed along with specific category buttons. In some implementations, messages may be categorized into such a taxonomy as they are received. In some implementations, the filter bar 222 can include additional buttons for navigating directly to a "deals" or "products" page, as described in more detail herein (e.g., in FIG. 2F).

Figure 2D:
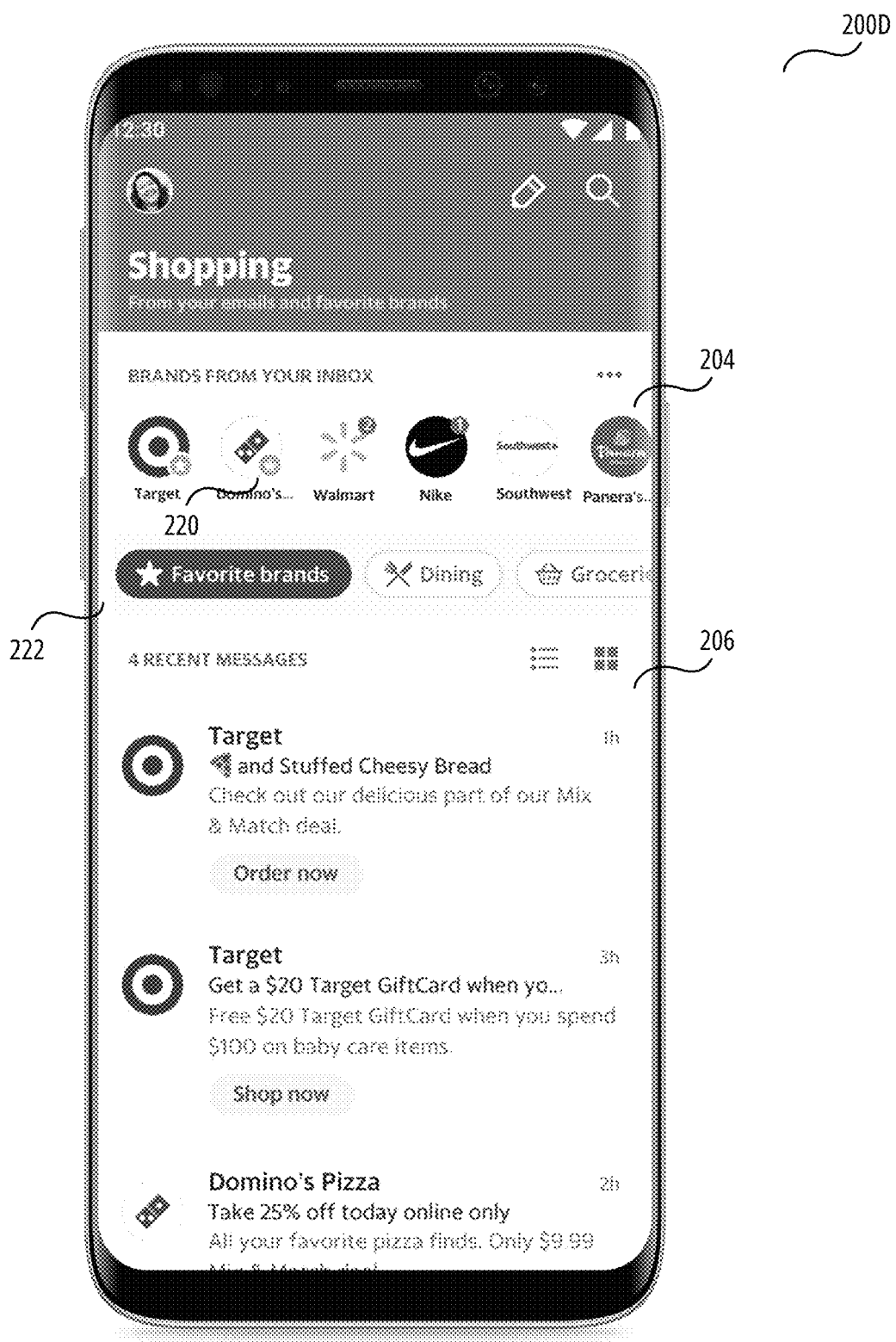
Figure 2E:
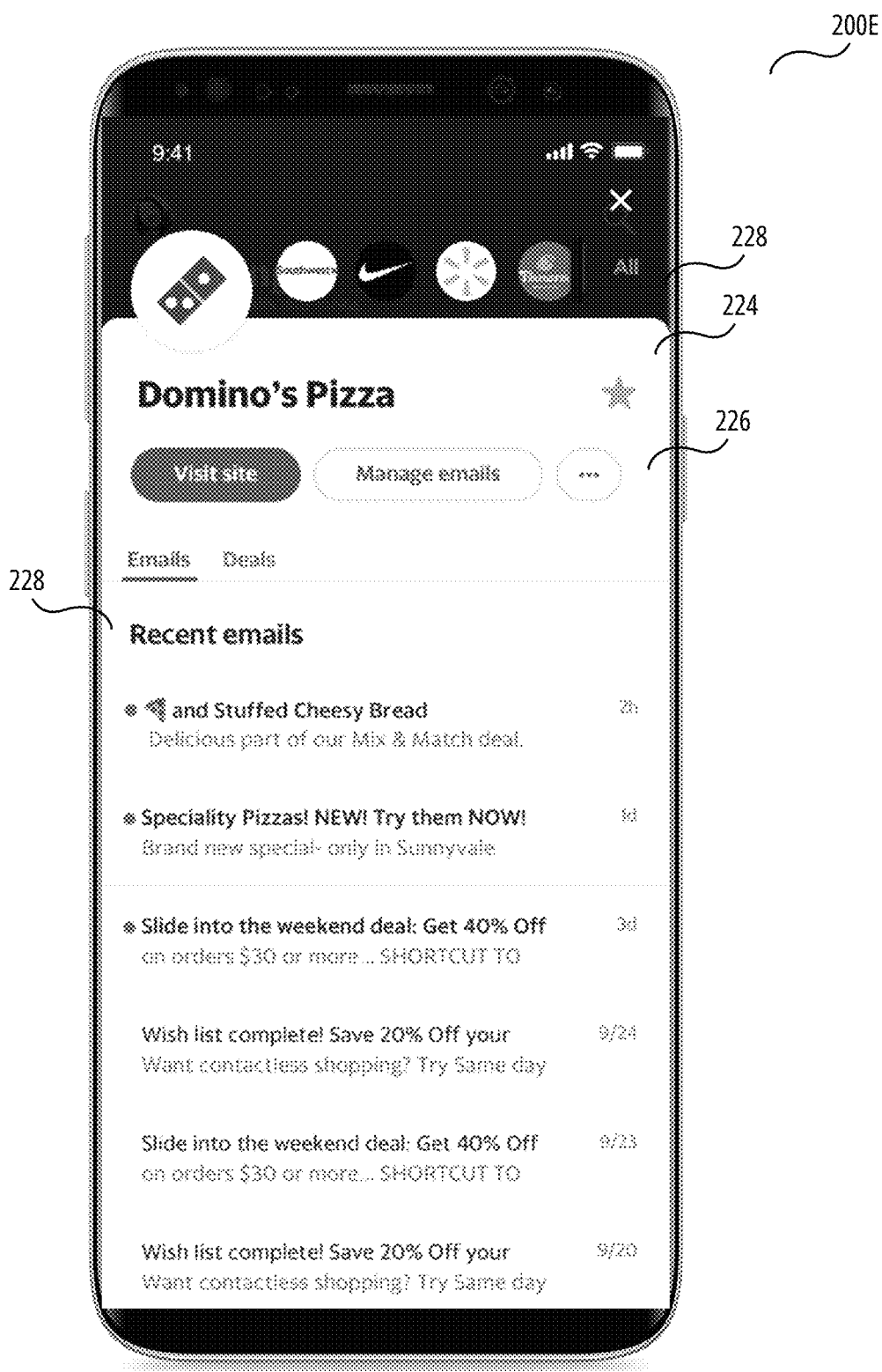

As illustrated in FIG. 2D, when "Favorite Brands" is selected only messages from "Target" and "Domino's" are displayed in message list 206 while messages from "Walmart" and "Nike" are not. Similarly, selection of the "Dining" button or "Clothing" button filters the messages to only display messages categorized as such. In some embodiments, this categorization can be performed server-side and each message can be tagged with a category. In other embodiments, selection of the buttons of filter bar 222 can trigger a query to a server to retrieve all such categorized messages.

The icons in carousel 204 can be interacted with. In an embodiment, when a user selects a given sender (e.g., icon 220), a sender-specific message list 224 can be displayed, as illustrated in fifth screen 200E of FIG. 2E. In the illustrated embodiment, the fifth screen 200E displays details regarding the sender (which may or may not be favorited). The sender-specific message list 224 can include controls 226 that allow the user to perform sender-specific actions. For example, the controls 226 can include a button to visit a website of the sender or manage all emails from the sender. The sender-specific message list 224 can also include a message list 228 that includes only emails from the selected sender. In some embodiments, the fifth screen 200E can include a scrollable icon list 228 to enable switching between senders.

Figure 2F:
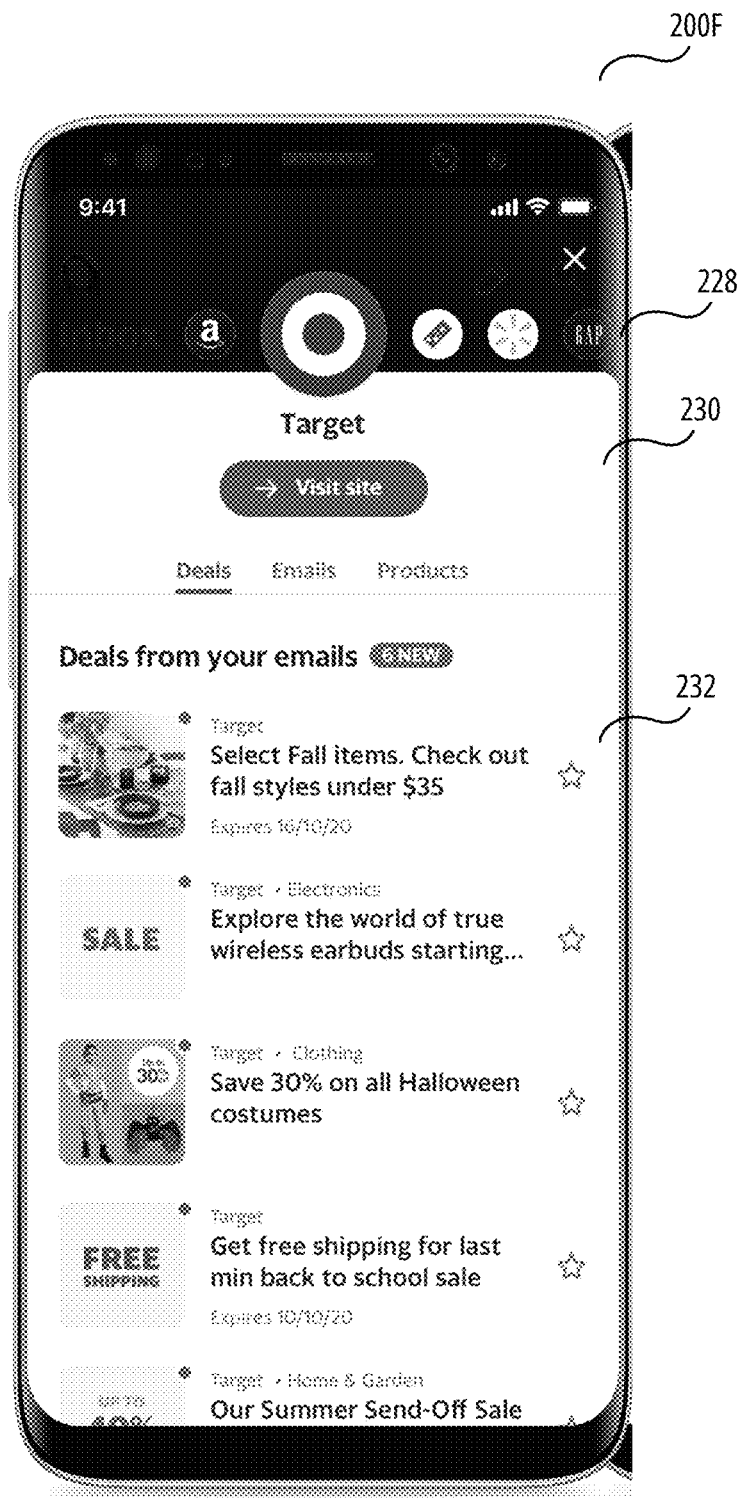

In FIG. 2F, a second screen 200F of a sender-specific message list 224 is depicted wherein a set of "deals" found within messages are displayed. Specifically, the page 230 includes a listing 232 of deals surfaced by extracting content from messages. In some implementations, page 230 can also include sub-pages for displaying messages from the sender, receipts, and products. In some implementations, these links may navigate to a position in listing 232 while in other implementations, each sub-page may be displayed as a separate page. In brief, receipts may comprise messages that are automatically categorized as receipts in email and may be tagged as such and displayed separate (or in addition) to messages in the message listing. Similarly, products may include extracted products found in messages and displayed (e.g., with images, titles, prices, hyperlinks to merchant websites, etc.). Alternatively, or in conjunction with the foregoing, products may comprise sponsored listings from a sender and may not necessarily be tied to message content. Alternatively, or in conjunction with the foregoing, products may comprise suggested products from senders identified based on profile or demographic data of the receiver of the messages. In some implementations, the presence of deals, emails, products, and/or receipt options may be dependent on whether corresponding data has been detected and extracted for these categories. For example, if no receipts are found, the receipts option may not be displayed (as illustrated in FIG. 2F).

In some implementations, filter bar 222 can include buttons for deals, products, and/or receipts. In some implementations, these buttons can include an aggregated view of all deals, products, and/or receipts aggregated across all senders. The specific details of the pages are similar to the per-sender counterparts, however the aggregated page will display all deals, products, and/or receipts for all senders in a unified view, allowing users to browse such categories across senders (whereas FIG. 2F illustrates a single sender view). In some implementations, deals, products, and/or receipts may be organized based on an expiration date extracted from the corresponding messages. In some implementations, the deals, products, and/or receipts can be ranked into categories (e.g., "most popular," "expiring soon," "includes promo code") and can be grouped accordingly. In some implementations, these categories may not be mutually exclusive and a single deal, product, or receipt can be included in multiple such categories (e.g., a deal expiring soon and including a promo code).

In the foregoing embodiments of FIGS. 2A through 2E, the selection of pre-identified designated senders for inclusion into a list of favorites comprises an onboarding procedure. As discussed briefly, this onboarding procedure seeds the application for future visualizations, which are discussed in more detail herein.

FIGS. 3A through 3D illustrate user interface states of a domain-based browsing process according to some of the example embodiments.

In a first screen 300A, a plurality of graphical user interface (GUI) elements similar to that described in FIGS. 2A through 2E are depicted and those descriptions are not repeated herein. In general, first screen 300A represents a "home" screen of a domain-based visualization and includes a message list 206 as well as a carousel 204 and filter bar 222. Users can browse message list 206 by swiping, scrolling, or otherwise interacting with the message list 206 in a traditional manner.

As illustrated, a given message can include call to action button. For example, first message 322 includes a first call-to-action button 308 while second message 324 includes a second call-to-action button 310. In some embodiments, the call-to-action buttons can be associated with a navigation to a different screen of the mobile application or can comprise an external link. In some embodiments, the underlying action of the call-to-action button can be scraped from the content of the message itself. For example, a uniform resource locator (URL) or other network address can be extracted from a Hypertext Markup Language (HTML) message body. In some embodiments, the extracted URL can be classified based on the location of the URL or based on surrounding text. For example, call-to-action button 308 can forward the user to an ordering page for "Stuffed Cheesy Bread." In such a scenario, the mobile application or a server-side component and parse the message and classify the message as having an ordering intent. Then, either device can extract the most appropriate link (based on a known template or based on machine learning or natural language processing) and use the URL of the link as the call-to-action target. As another example, second call-to-action button 310 can direct the user to a shopping page in which the user can browser a list of athleisure wear. In such a scenario, a device can analyze the email to determine that the classification of the email is a general deal or coupon that is widely applied to multiple product types. Thus, a device can extract a link ("Shop Now!") in the message and use the underling URL as the call-to-action target.

In the illustrated first screen 300A, the message list 206 further includes a list view toggle 316 and a preview view toggle 314 (which displays screen 300D). In some implementations, the preview toggle can comprise a single icon (e.g., such as an "eye" or similar graphic) that is bi-modal and toggles a preview mode on and off. In some implementations, the single icon can include bi-model text (e.g., "Previews ON" and "Previews OFF") to indicate the current state. In an embodiment, the toggle 316 displays a chronological list of domain-specific messages, as depicted in first screen 300A. By contrast, selection of preview view toggle 314 displays a preview-based view of the messages, as depicted in fourth screen 300D. As illustrated in fourth screen 300D, when the preview view toggle 314 is selected, a given message 326 is expanded to include a preview 318 of the message contents. In some embodiments, the preview 318 can comprise a rendering of the original message. In other embodiments, the preview 318 can include a re-formatting of the original message (e.g., removing extraneous header, navigation, footer elements). In some embodiments, the preview 318 can further include an expanded call-to-action button 320. In some implementations, the call-to-action button 320 may be optional. In some embodiments, the call-to-action button 320 can operate similar to first call-to-action button 308 or second call-to-action button 310 and that functionality is not repeated herein.

Figure 3A:
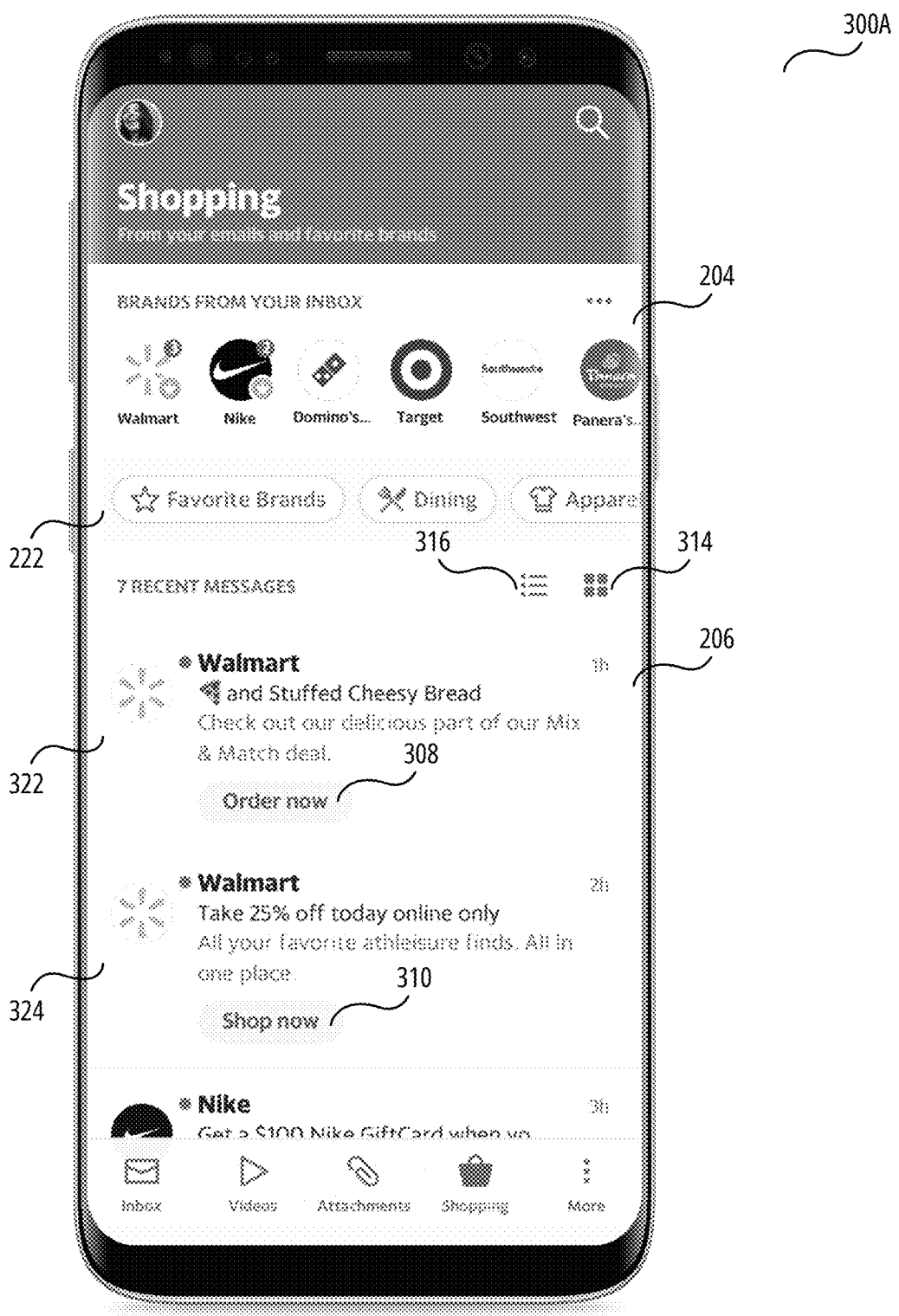
FIGS. 3A through 3D illustrate user interface states of a domain-based browsing process according to some of the example embodiments.
Figure 3B:
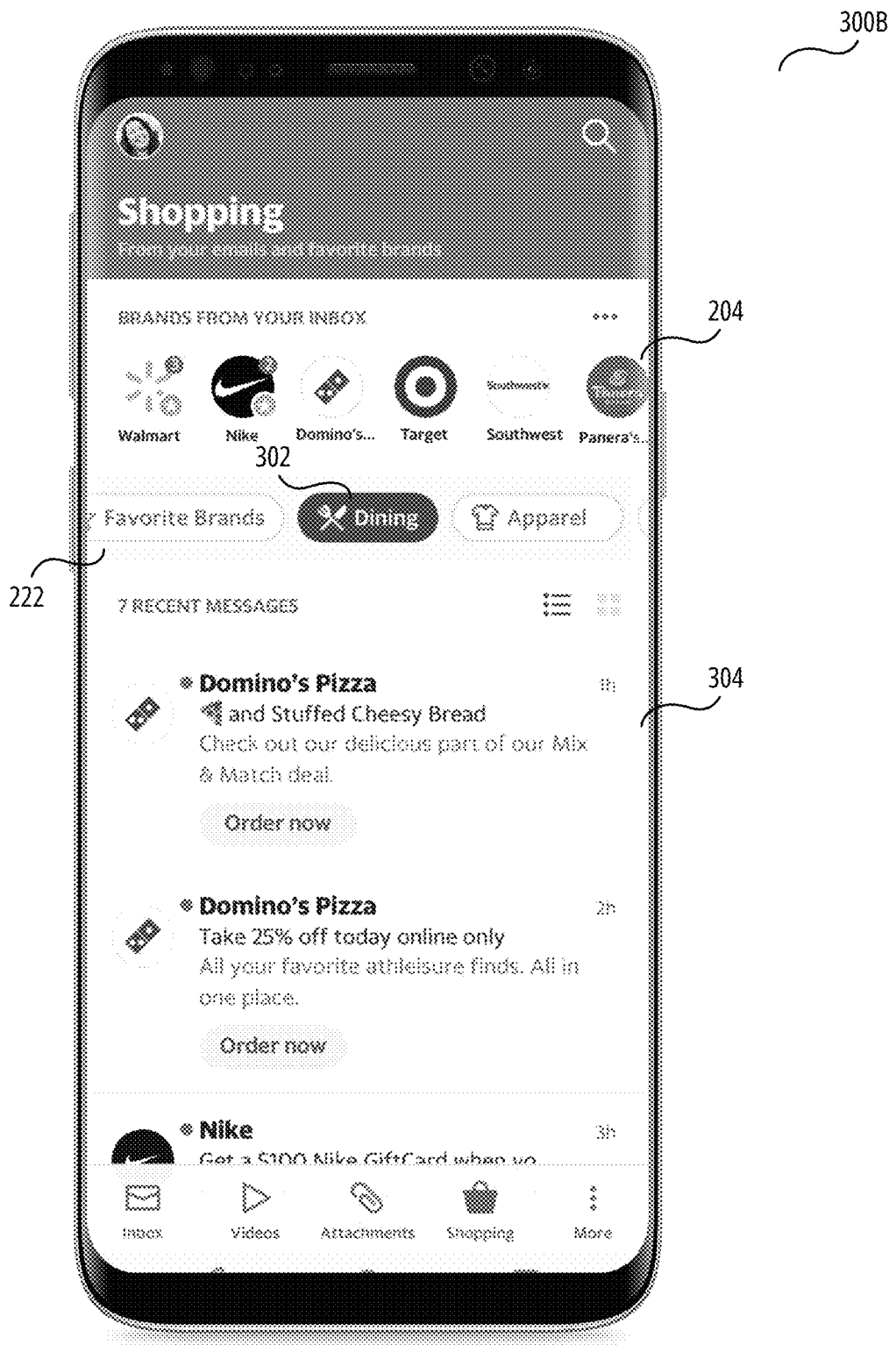
Figure 3C:
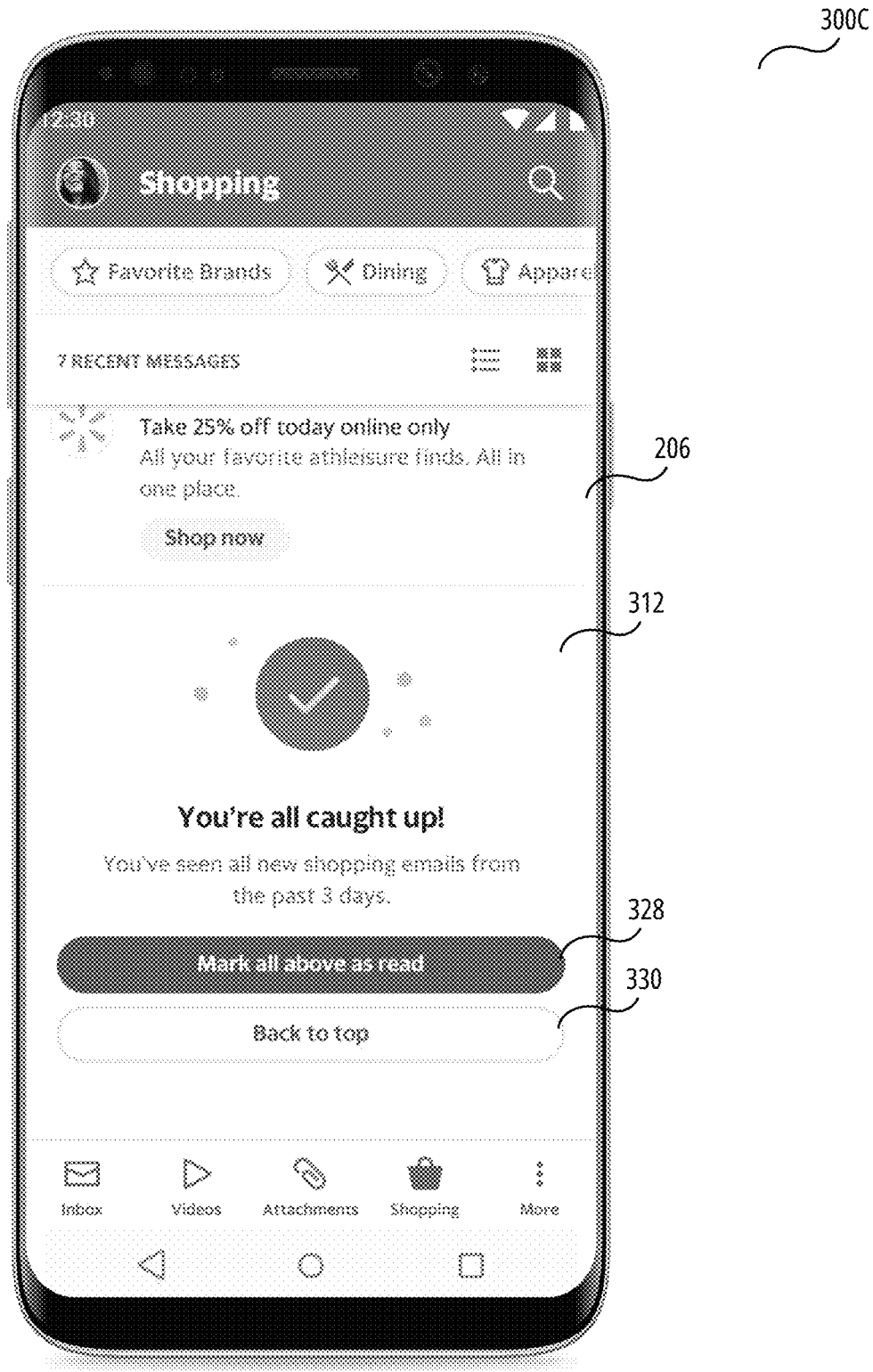
Figure 3D:
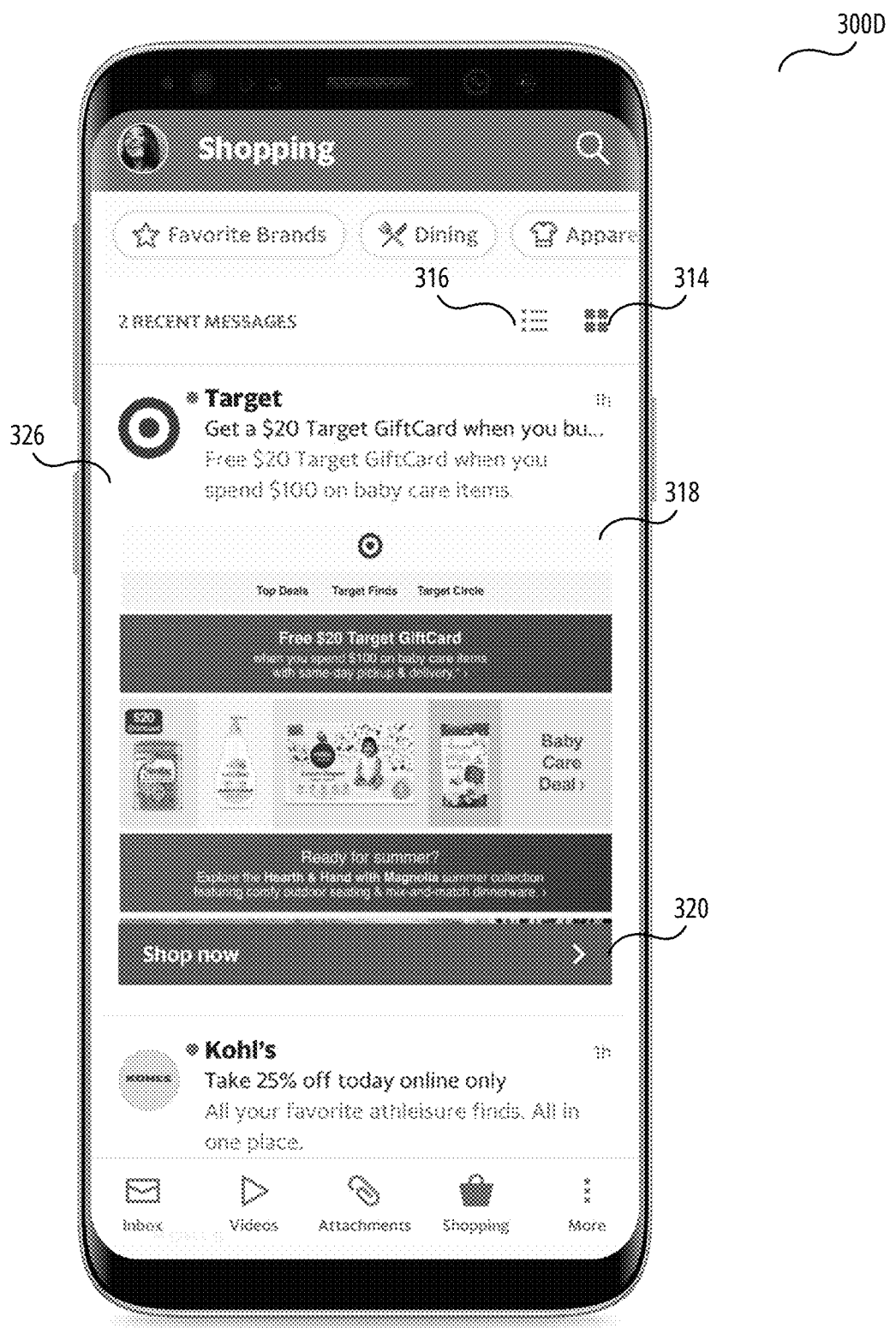

In second screen 300B, a user has selected a filter 302 in filter bar 222. The various filters (e.g., filter 302) correspond to different taxonomy classifications of messages. In some embodiments, the taxonomy can comprise a global taxonomy built for all users of the messaging application. In another embodiment, the taxonomy can be user-specific. That is, the taxonomy can be built based on the types of messages the user receives and/or interacts with. As illustrated, when the user selects the filter 302, the message list 206 of FIG. 3A is updated only display "Dining" messages in message list 304. As in FIG. 3A, a user can still toggle between list view and preview view and can interact with call-to-action buttons as in message list 206 and that disclosure is not repeated herein.

As described above, a user can scroll through message list 206 or message list 304 to enable them to view all relevant message. Once a user has viewed all messages displayed, an end-of-scroll action panel 312 may be displayed as depicted in third screen 300C depicted in FIG. 3C. In an embodiment, the end-of-scroll action panel 312 can include a plurality of actions such as a mark all read action 328 or a back to top action 330. In an embodiment, the mark all read action 328 can mark all messages in the message list 206 as read, reducing the number of interactions required by a user. In some embodiments, the mark all read action 328 can be applied to all messages in the message list 206. Thus, if the message list 206 only displays a subset of all messages (as in message list 304), the mark all read action 328 can be configured to only mark that subset as unread. In the illustrated embodiment, the back to top action 330 can be configured to automatically scroll the user to the top of message list 206.

Figure 4A:
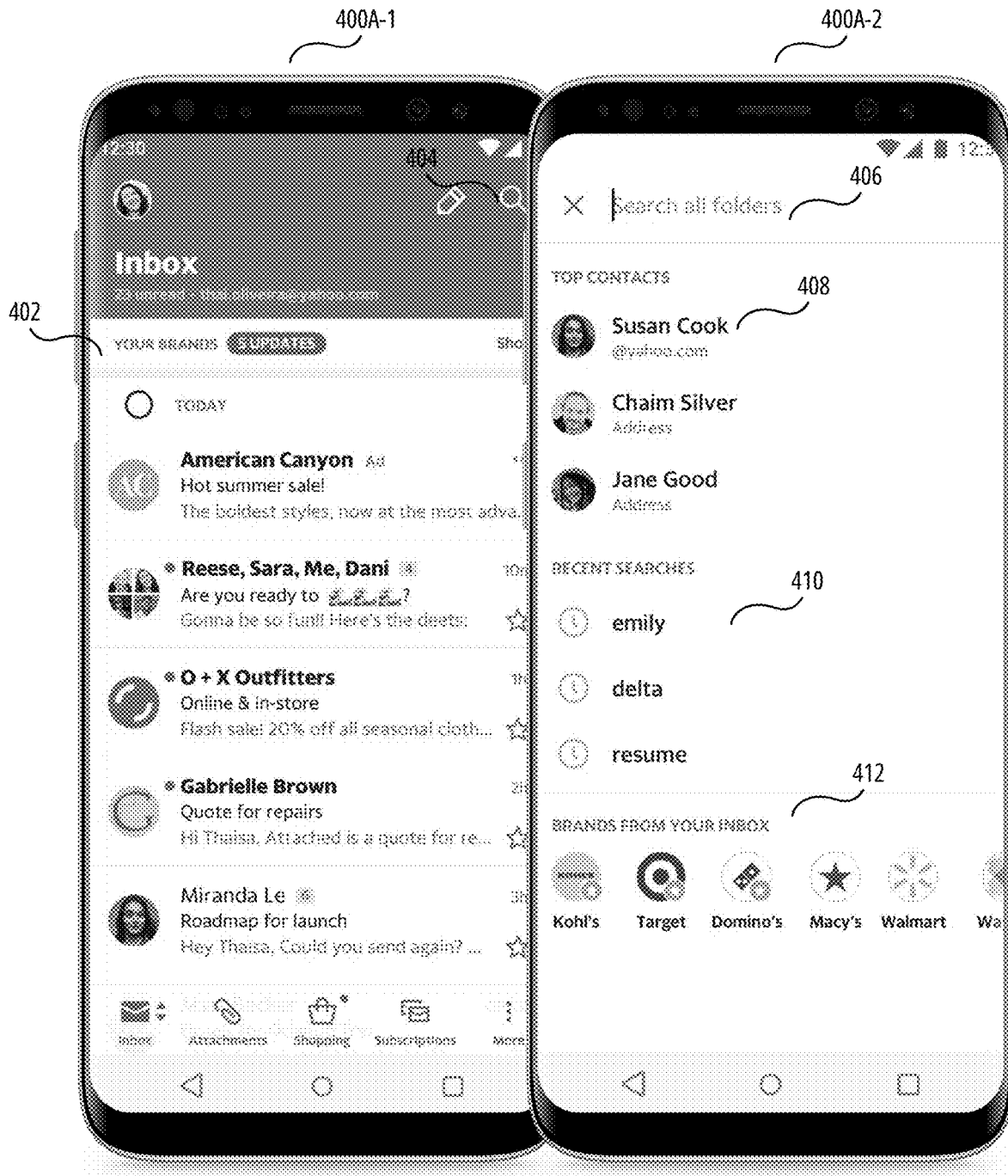
FIGS. 4A through 4C illustrate user interface states of a domain-based search process according to some of the example embodiments.
Figure 4B:
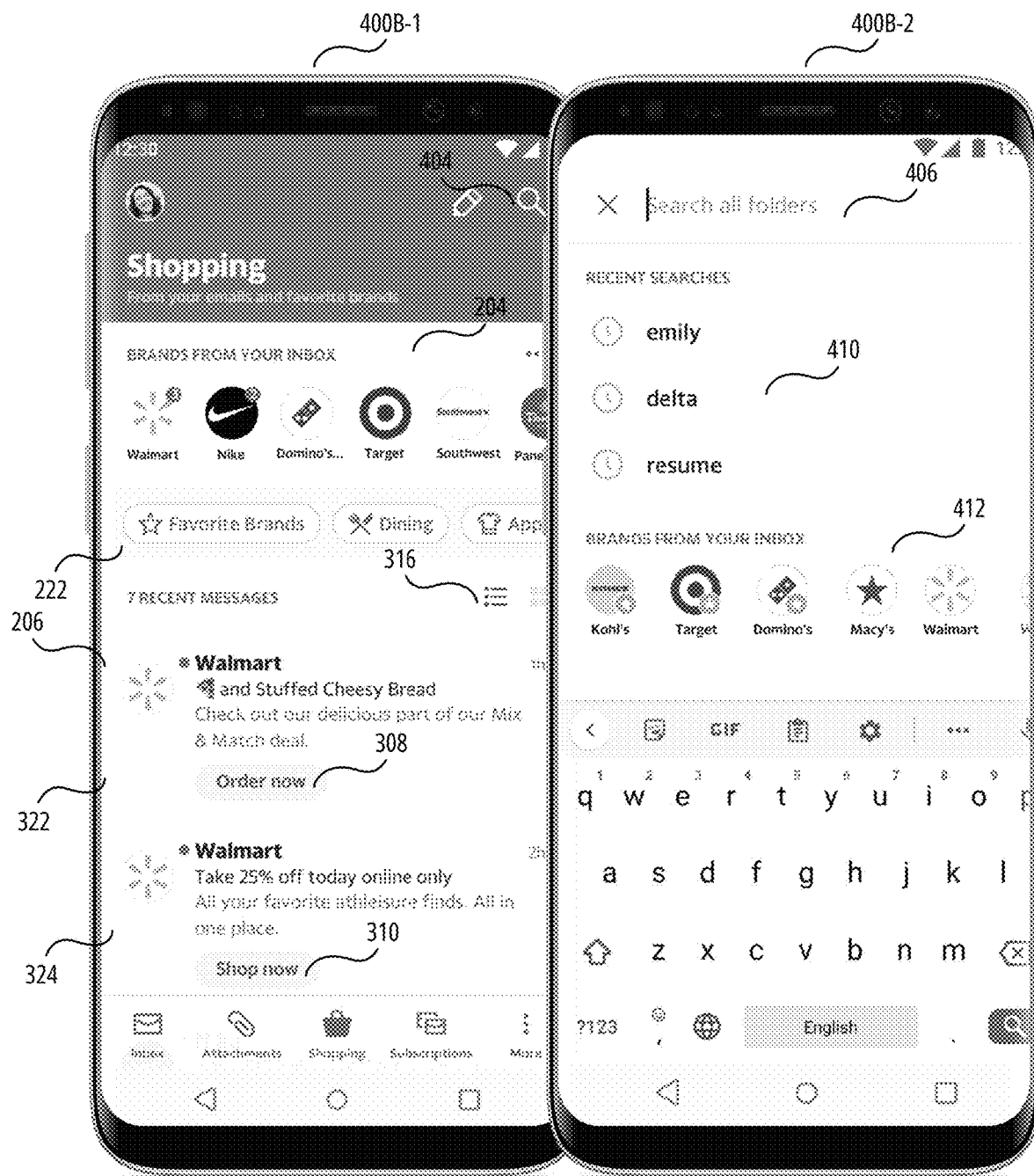
Figure 4C:
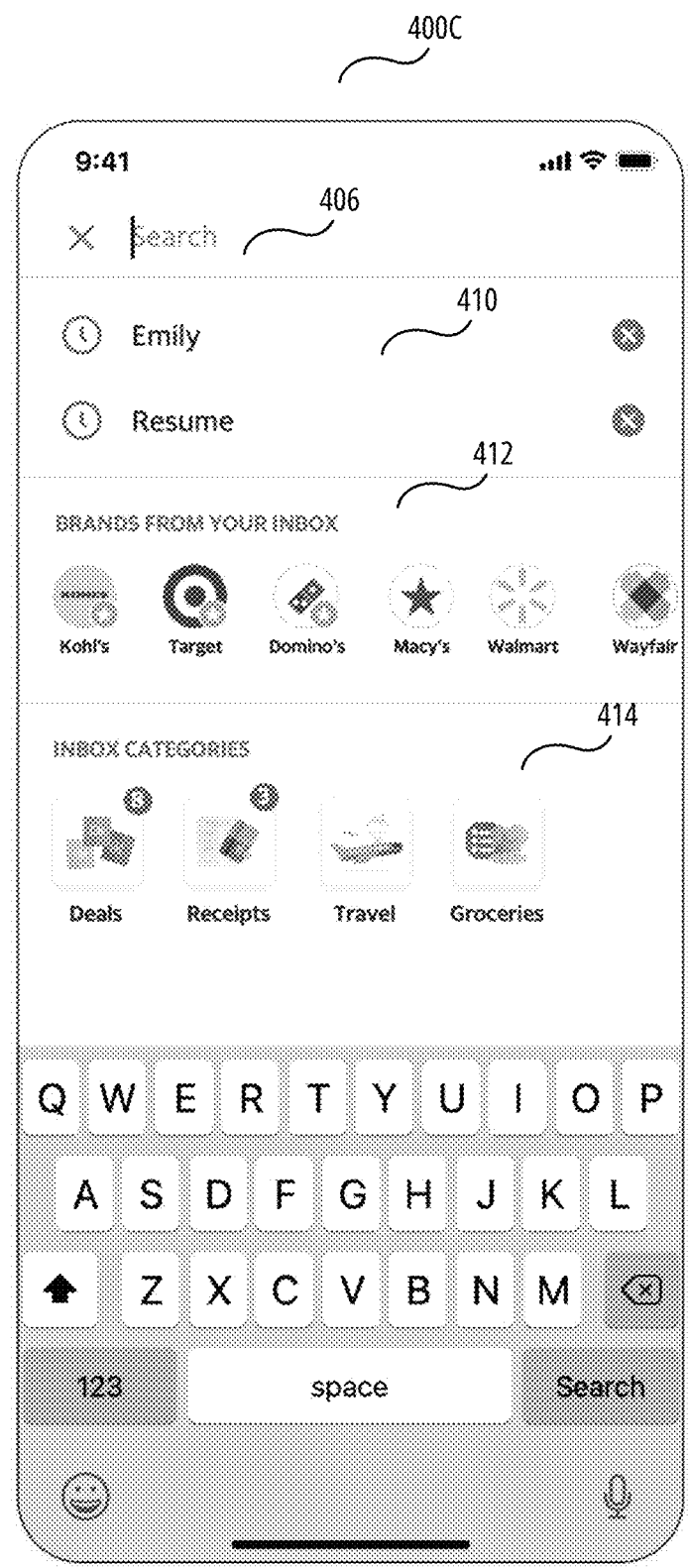

FIGS. 4A through 4C illustrate user interface states of a domain-based search process according to some of the example embodiments.

FIG. 4A illustrates a global search function in a messaging application. As illustrated, a first screen 400A-1 displays a list of all messages associated with the user. In some embodiments, a collapsed domain panel 402 can be included in the first screen 400A-1. In an embodiment, the user can select the collapsed domain panel 402 (or a control such as the "Show" or "Updates" control) to expand the panel which will then be rendered as carousel 204 and filter bar 222, the description of which is not repeated herein.

As illustrated, a user can search all messages via a search button 404. In response to selecting the search button 404, a second screen 400A-2 is displayed which allows for freeform search queries in input field 406. In the illustrated embodiment, since the search is global, the second screen 400A-2 may include a contact section 408 for displaying contacts that match the query, a recent searches section 410 that displays recent searches, and a domain section 412 that displays icons representing domain objects. In an embodiment, the domain objects can comprise brands associated with the user based on previous messages and/or interactions.

In some embodiments, when the user begins typing a query, the various sections can be filtered based on the query. In some embodiments, some sections can be replaced. For example, recent searches section 410 can be replaced with a message list of matching messages. In some embodiments, other sections can be included such as a domain-specific message section that displays messages in a specific domain that match the query. For example, as illustrated in screen 400C of FIG. 4C, the search interface can include tab shortcut section 414 that allows users to navigate between screens of the messaging application based on the results of the search. Further, the icons in the tab shortcut section 414 can be adorned with badges indicating the number of matches. In some embodiments, the icons in tab shortcut section 414 can correspond to taxonomy categories as discussed previously.

In some embodiments, the search interface can be modified based on the underlying screen. For example, when a user is in a first screen 400B-1 that comprises the domain-specific screen ("Shopping"), the search interface of second screen 400B-2 can be adjusted based on the presence in the domain-specific screen. That is, the contact section 408 can be removed and only the recent searches section 410 and domain section 412 remain. In such a scenario, the user may not be interested in searching contacts when attempting to perform a domain-specific search and thus the contact section 408 can be removed to increase screen real estate elements.

Figure 5A:
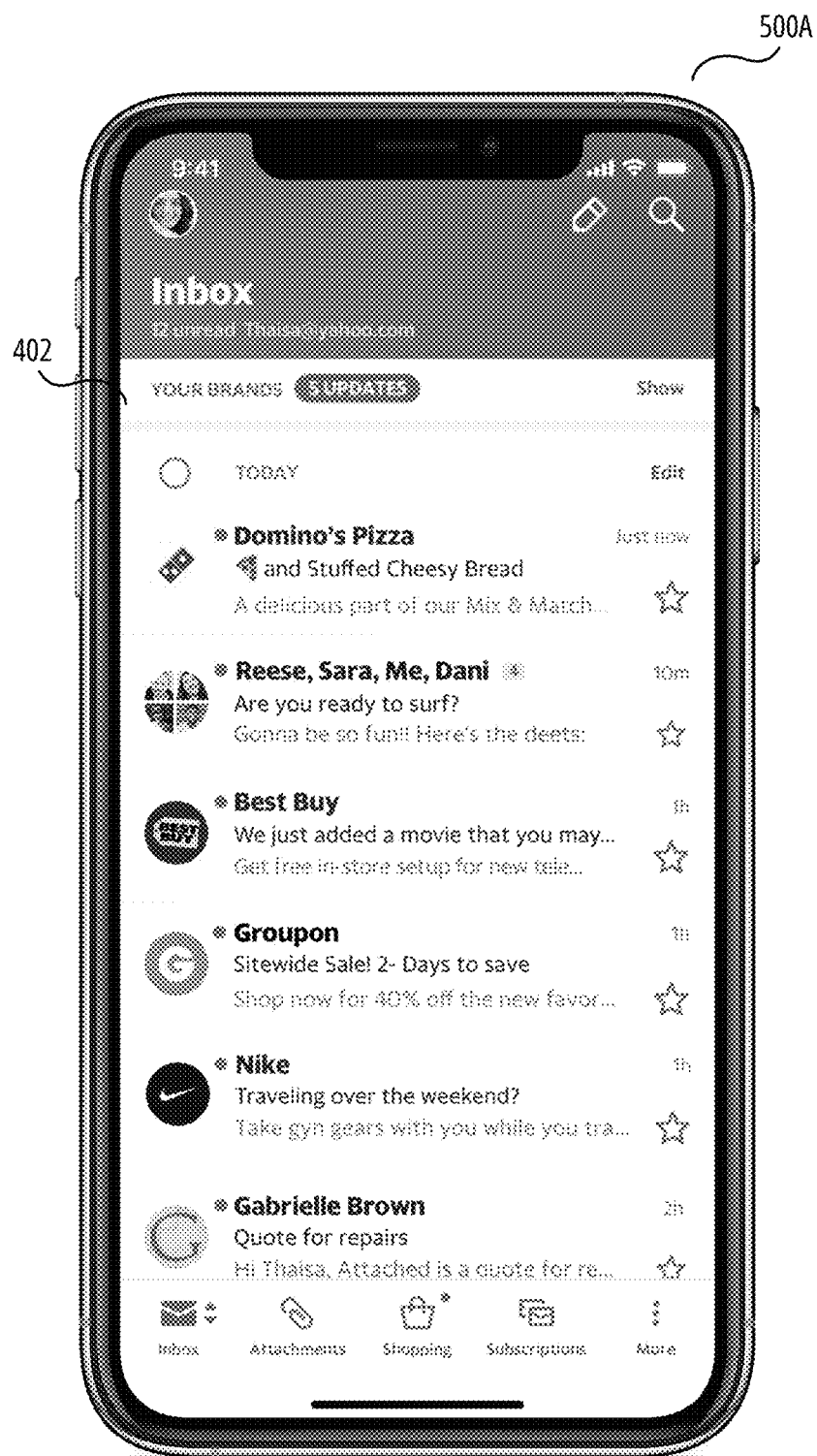
FIGS. 5A through 5C illustrate user interface states of a domain-based discovery process according to some of the example embodiments.
Figure 5B:
Figure 5C:
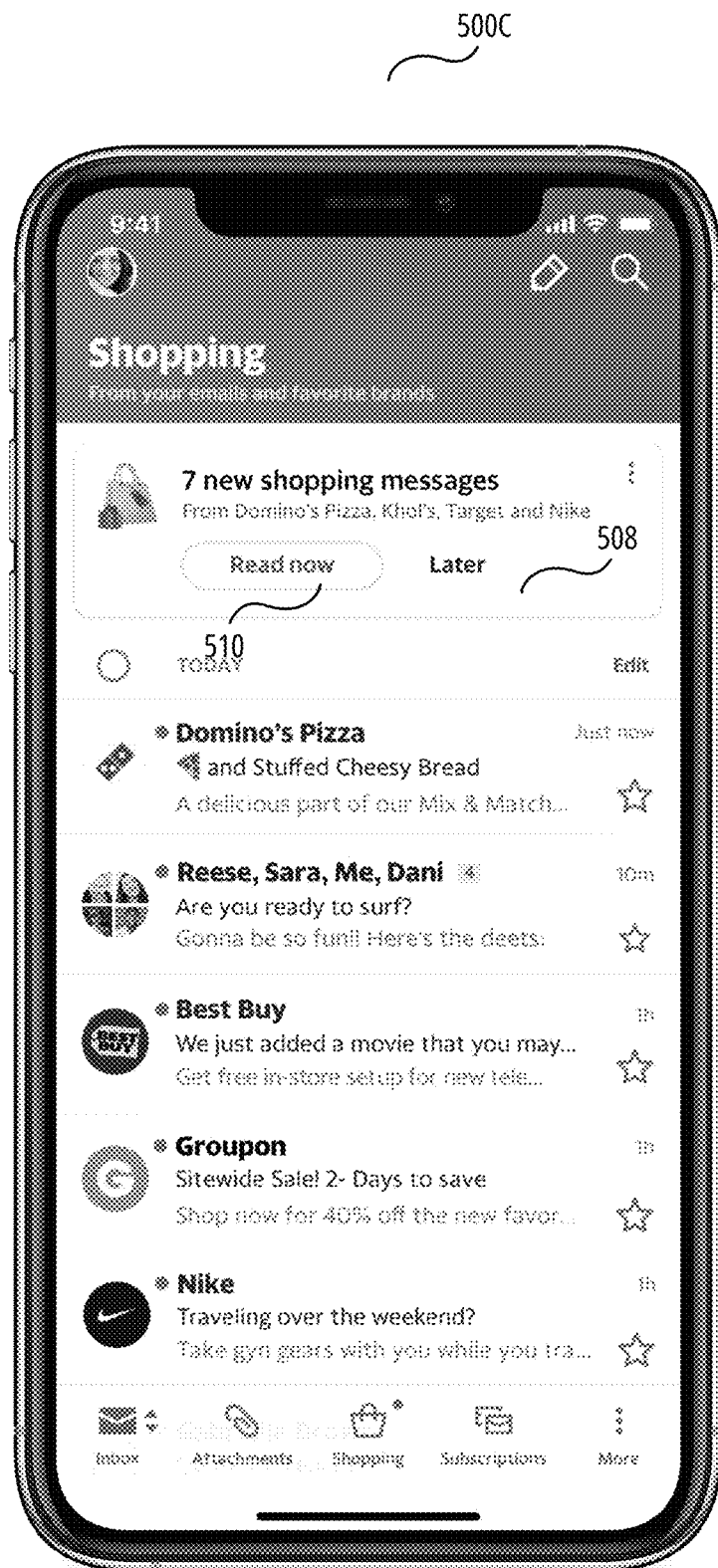

FIGS. 5A through 5C illustrate user interface states of a domain-based discovery process according to some of the example embodiments.

In FIGS. 5A through 5C various approaches to allow discovery of the domain-based visualization are described. In screen 500A, a collapsed domain panel 402 is presented on top of a generic message list. As described above, the user can select the collapsed domain panel 402 (or a control such as the "Show" or "Updates" control) to expand the panel which will then be rendered as carousel 204 and filter bar 222, the description of which is not repeated herein.

In screens 500B, a top of inbox, TOI panel 502 is presented on a generic message list that includes various summary statistics of the domain-based visualization (e.g., number of classified messages, brand names, icons, etc.). When the user selects the TOI panel 502, a menu 504 can be expanded that presents a ranked list of brands (as described in FIG. 1). In some embodiments, the ranked list can comprise the most recent message from each brand. In other embodiments, the menu 504 can present the most recent messages for domain-specific senders, regardless of their rankings. In an embodiment, the menu 504 can include a button 506 that navigates the user to the domain-based visualizations described above.

In screen 500C, a suggestion card 508 can be presented on the top of a generic message list. As in screen 500A, the suggestion card 508 can include high-level summary data of the domain-based visualization (e.g., number of messages, sender names, etc.). In some embodiments, the suggestion card 508 can include a call-to-action button 510 that allows the user to navigate to the domain-based visualizations described above.

Figure 7:
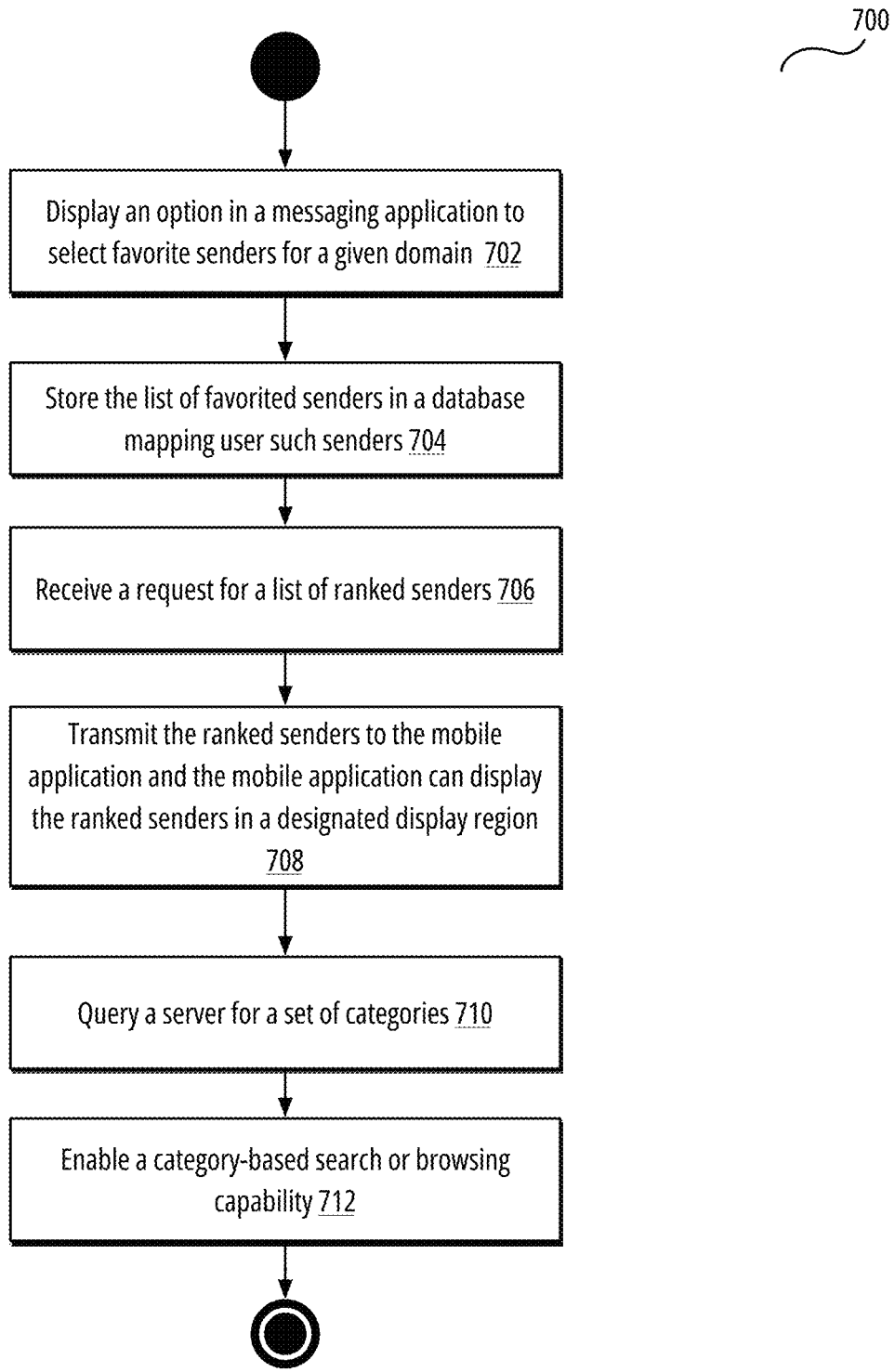
FIG. 7 is a flow diagram illustrating an onboarding procedure according to some of the example embodiments.

FIG. 7 is a flow diagram illustrating an onboarding procedure according to some of the example embodiments. The various steps are further described in FIGS. 2A through 2F and are not repeated herein in detail.

In step 702, method 700 can include displaying an option in a messaging application to select favorite senders for a given domain (e.g., shopping). In one embodiment, method 700 can comprise pre-identifying such senders based on the messages addressed to a user and presenting a list of options for the user to select.

In step 704, method 700 can include storing the list of favorited senders in a database mapping user such senders.

In step 706, method 700 can comprise receiving a request for a list of ranked senders. In an embodiment, method 700 can compute a predicted ranking for each sender a user has interacted with (i.e., has received a message from). As described in FIG. 1, this predicted ranking can be generated using a predictive model and can be trained using various features of users, senders, and messages. In some embodiments, an explicit marking as a favorite can be a feature. In some embodiments, such a manual marking can be heavily weighted during training and thus surface such manually favorited senders.

In step 708, method 700 can comprise transmitting the ranked senders to the mobile application and the mobile application can display the ranked senders in a designated display region such as carousel 204. In some embodiments, the mobile application can further use the ranked list to identify manual favorites and allow users to filter message view based on favorites via, for example, filter bar 222.

In step 710, method 700 can comprise querying a server for a set of categories (i.e., a taxonomy). In some embodiments, the set of categories can be built using a classification model as described in FIG. 1. In some embodiments, step 710 can be executed in parallel with steps 702 through 708 or can be executed before step 702. In some embodiments, the taxonomy can be specific to the user or can be global.

In step 712, method 700 can comprise enabling a category-based search or browsing capability using the set of categories, as discussed in more detail herein.

Figure 8:
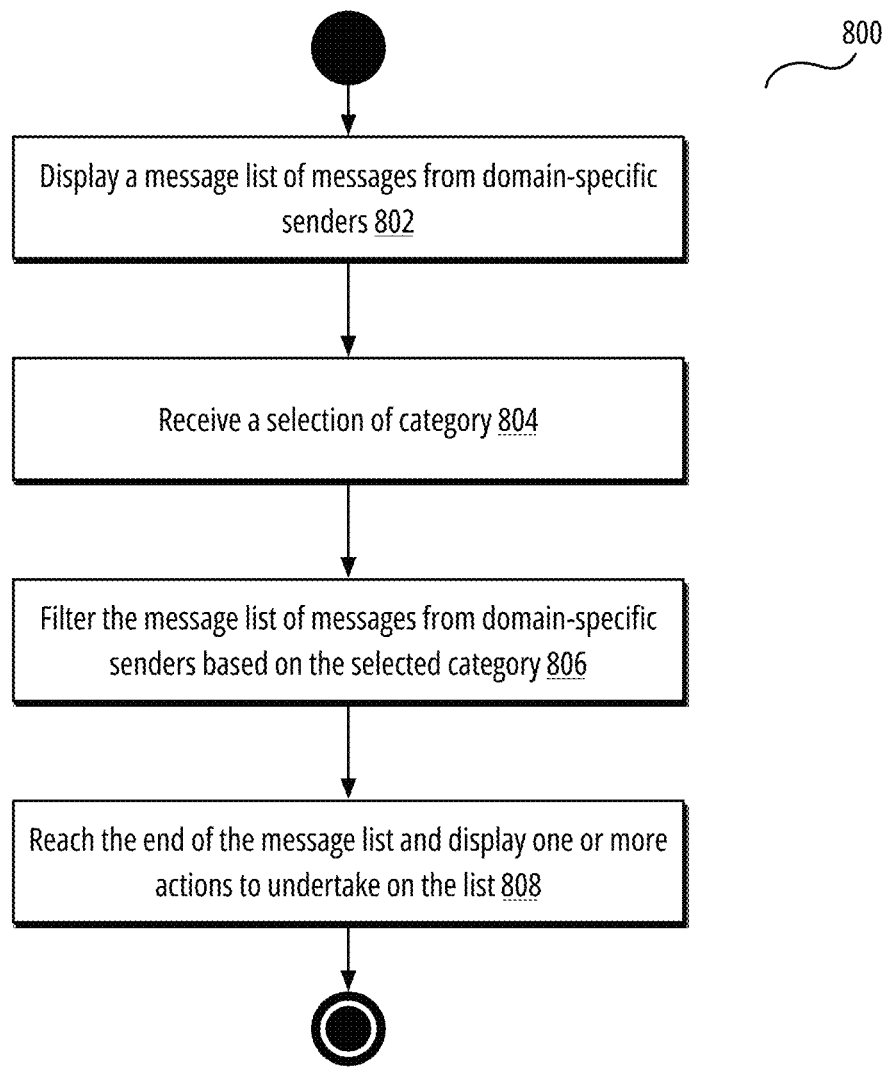
FIG. 8 is a flow diagram illustrating a browsing process according to some of the example embodiments.

FIG. 8 is a flow diagram illustrating a browsing process according to some of the example embodiments. The various steps are further described in FIGS. 3A through 3D and are not repeated herein in detail.

In step 802, method 800 can comprise displaying a message list of messages from domain-specific senders. In some embodiments, the domain-specific senders comprise a ranked list of senders as previous described. In some embodiments, the message list can comprise only messages from a single sender. In some embodiments, the message list can display the messages in either list view or preview view mode.

In step 804, method 800 can comprise receiving a selection of category. In some embodiments, the category can comprise one of the categories returned in response to the request in step 710.

In step 806, method 800 can comprise filtering the message list of messages from domain-specific senders based on the selected category. In an embodiment, each message can be associated with a category and thus the filtering can only display those messages associated with the selected category.

In step 808, method 800 can comprise reaching the end of the message list and displaying one or more actions to undertake on the list. In an embodiment, the actions include a mark all as read option.

Figure 9:
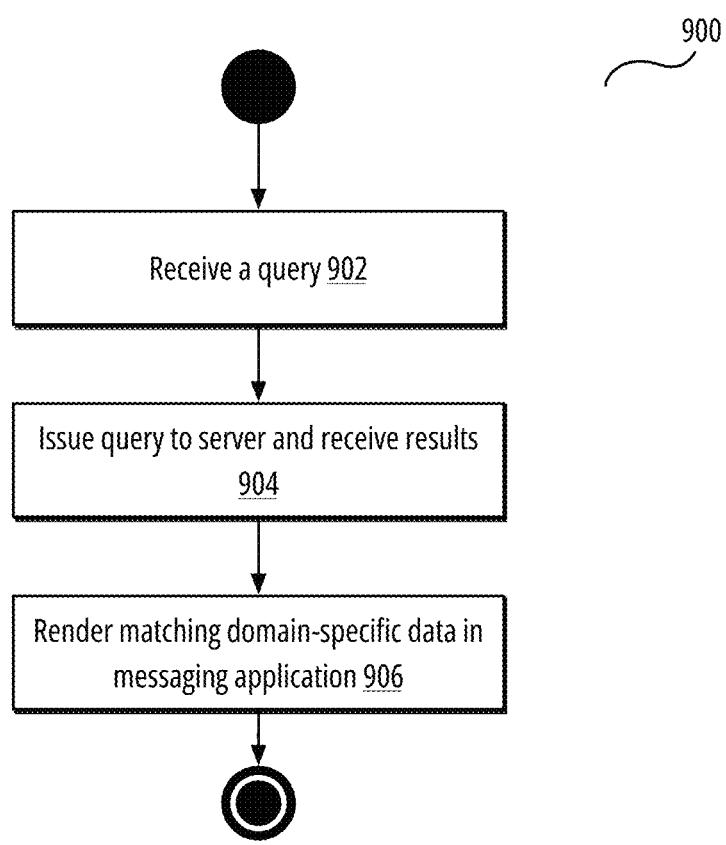
FIG. 9 is a flow diagram illustrating a search process according to some of the example embodiments.

FIG. 9 is a flow diagram illustrating a search process according to some of the example embodiments. The various steps are further described in FIGS. 4A through 4C and are not repeated herein in detail.

In step 902, method 900 can include receiving a search query. In some embodiments, the search query can be input in a top level messaging application or in a domain-specific screen.

In step 904, method 900 can include issuing the search query to a server. In response, the server can perform a search using a user identifier, the search query, and one or more sender-specific databases (e.g., brand databases). For example, in some embodiments, the server can search a list of preferred or ranked senders (e.g., brands) and return a set of matching search results to the client device issuing the search query.

In step 906, method 900 can include rendering representations of the matching sender objects. For example, method 900 can comprise rendering icons of brands or senders within a search interface. In some embodiments, method 900 can further comprise displaying messages associated with matching senders. In some embodiments, method 900 can simultaneously display other types of matching data such as top contacts or inbox categories.

FIG. 6 is a block diagram of a computing device 600 according to some embodiments of the disclosure.

As illustrated, the device includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving a plurality of messages and a plurality of entities, wherein a subset of the plurality of messages was transmitted to a receiver by the plurality of entities;
displaying the plurality of messages in a message view;
displaying a designated display region listing the plurality of entities;
detecting a selection of a selected entity from the plurality of entities based on a user interaction with the designated display region; and
displaying a sender-specific message list in response to the selection, the sender-specific message list including a first screen including a message list that displays messages from the selected entity and a second screen including a subset of the messages from the selected entity, the subset of the messages surfaced by extracting content from the messages from the selected entity, wherein the second screen is displayed concurrently with the first screen and comprises a preview of the extracted content, and wherein the second screen further comprises an action button configured to perform an action associated with the extracted content.

2. The method of claim 1, wherein displaying the designated display region listing the plurality of entities comprises displaying a carousel including icons associated with the plurality of entities.

3. The method of claim 2, wherein the carousel comprises a scrollable carousel.

4. The method of claim 2, wherein the icons associated the plurality of entities each include a corresponding badge, the corresponding badge including a count of message associated with a corresponding entity.

5. The method of claim 1, further comprising identifying the plurality of entities based on one or more of interactions of the plurality of entities with the receiver or interactions of the receiver with the plurality of entities.

6. The method of claim 1, further comprising:
displaying a filter bar designated display region, the filter bar designated display region including a plurality of buttons corresponding to a plurality of filters, each filter in the plurality of filters corresponding to a category of a sender;
detecting a user interaction with a selected button in the filter bar designated display region; and
updating the message view to including only messages from a set of senders corresponding to a selected category associated with the selected button.

7. The method of claim 1, wherein the sender-specific message list includes a button to visit a website of the selected entity and controls to manage messages associated with the selected entity.

8. A non-transitory computer-readable storage medium for tangibly storing computer program instructions capable of being executed by a computer processor, the computer program instructions defining steps of:
receiving a plurality of messages and a plurality of entities, wherein a subset of the plurality of messages was transmitted to a receiver by the plurality of entities;
displaying the plurality of messages in a message view;
displaying a designated display region listing the plurality of entities;
detecting a selection of a selected entity from the plurality of entities based on a user interaction with the designated display region; and
displaying a sender-specific message list in response to the selection, the sender-specific message list including a first screen including a message list that displays messages from the selected entity and a second screen including a subset of the messages from the selected entity, the subset of the messages surfaced by extracting content from the messages from the selected entity, wherein the second screen is displayed concurrently with the first screen and comprises a preview of the extracted content, and wherein the second screen further comprises an action button configured to perform an action associated with the extracted content.

9. The non-transitory computer-readable storage medium of claim 8, wherein displaying the designated display region listing the plurality of entities comprises displaying a carousel including icons associated with the plurality of entities.

10. The non-transitory computer-readable storage medium of claim 9, wherein the carousel comprises a scrollable carousel.

11. The non-transitory computer-readable storage medium of claim 9, wherein the icons associated the plurality of entities each include a corresponding badge, the corresponding badge including a count of message associated with a corresponding entity.

12. The non-transitory computer-readable storage medium of claim 8, the steps further comprising identifying the plurality of entities based on one or more of interactions of the plurality of entities with the receiver or interactions of the receiver with the plurality of entities.

13. The non-transitory computer-readable storage medium of claim 8, the steps further comprising:
displaying a filter bar designated display region, the filter bar designated display region including a plurality of buttons corresponding to a plurality of filters, each filter in the plurality of filters corresponding to a category of a sender;
detecting a user interaction with a selected button in the filter bar designated display region; and
updating the message view to including only messages from a set of senders corresponding to a selected category associated with the selected button.

14. The non-transitory computer-readable storage medium of claim 8, wherein the sender-specific message list includes a button to visit a website of the selected entity and controls to manage messages associated with the selected entity.

15. A device comprising:
a processor; and
a storage medium for tangibly storing thereon logic for execution by the processor, the logic comprising instructions for:
receiving a plurality of messages and a plurality of entities, wherein a subset of the plurality of messages was transmitted to a receiver by the plurality of entities,
displaying the plurality of messages in a message view,
displaying a designated display region listing the plurality of entities,
detecting a selection of a selected entity from the plurality of entities based on a user interaction with the designated display region, and
displaying a sender-specific message list in response to the selection, the sender-specific message list including a first screen including a message list that displays messages from the selected entity and a second screen including a subset of the messages from the selected entity, the subset of the messages surfaced by extracting content from the messages from the selected entity, wherein the second screen is displayed concurrently with the first screen and comprises a preview of the extracted content, and wherein the second screen further comprises an action button configured to perform an action associated with the extracted content.

16. The device of claim 15, wherein displaying the designated display region listing the plurality of entities comprises displaying a carousel including icons associated with the plurality of entities.

17. The device of claim 16, wherein the carousel comprises a scrollable carousel.

18. The device of claim 16, wherein the icons associated the plurality of entities each include a corresponding badge, the corresponding badge including a count of message associated with a corresponding entity.

19. The device of claim 15, the instructions further comprising identifying the plurality of entities based on one or more of interactions of the plurality of entities with the receiver or interactions of the receiver with the plurality of entities.

20. The device of claim 15, the instructions further comprising:
displaying a filter bar designated display region, the filter bar designated display region including a plurality of buttons corresponding to a plurality of filters, each filter in the plurality of filters corresponding to a category of a sender;

detecting a user interaction with a selected button in the filter bar designated display region; and updating the message view to including only messages from a set of senders corresponding to a selected category associated with the selected button.

* * * * *